United States Patent
Woida-O'Brien

(10) Patent No.: US 10,377,509 B2
(45) Date of Patent: Aug. 13, 2019

(54) DYNAMIC TESTING OF ATTITUDE DETERMINATION AND CONTROL SYSTEMS, REACTION WHEEL AND TORQUE RODS USING AUTOMOTIVE ROBOTIC TECHNIQUES

(71) Applicant: Raytheon Company, Waltham, MA (US)

(72) Inventor: Rigel Quinn Woida-O'Brien, Tucson, AZ (US)

(73) Assignee: Raytheon Company, Waltham, MA (US)

(*) Notice: Subject to any disclaimer, the term of this patent is extended or adjusted under 35 U.S.C. 154(b) by 766 days.

(21) Appl. No.: 14/491,738

(22) Filed: Sep. 19, 2014

(65) Prior Publication Data

US 2016/0083117 A1    Mar. 24, 2016

(51) Int. Cl.
| G06F 11/30 | (2006.01) |
| G21C 17/00 | (2006.01) |
| G01L 25/00 | (2006.01) |
| B64F 5/60 | (2017.01) |

(52) U.S. Cl.
CPC .................... B64F 5/60 (2017.01)

(58) Field of Classification Search
CPC .... B64F 5/60; G06F 11/2221; G06F 11/3409; G06F 11/3447; G05B 23/02; G01R 31/34; G11B 20/1816
USPC ................................. 702/115, 182
See application file for complete search history.

(56) References Cited

U.S. PATENT DOCUMENTS

| 2003/0089183 A1* | 5/2003 | Jacobsen | G01N 29/045 73/865.8 |
| 2005/0230557 A1* | 10/2005 | Aghili | B64G 7/00 244/158.1 |
| 2009/0153993 A1* | 6/2009 | Garcia | G11B 5/4555 360/31 |
| 2010/0174522 A1* | 7/2010 | Stunkel | G01R 31/008 703/17 |
| 2013/0002273 A1* | 1/2013 | Min | G01R 31/001 324/750.01 |
| 2013/0017838 A1* | 1/2013 | Vavrina | B64G 7/00 455/456.1 |
| 2013/0103193 A1* | 4/2013 | Roberts | B23Q 3/155 700/245 |
| 2013/0125667 A1* | 5/2013 | Fitz-Coy | B64G 1/286 73/862.041 |
| 2016/0264262 A1* | 9/2016 | Colin | B25J 5/007 |

* cited by examiner

*Primary Examiner* — Michael P Nghiem

(57) ABSTRACT

A fully automated method for testing functionality of a spacecraft or aircraft unit under testing (UUT) includes selecting a test station at which to conduct a first functionality test on the UUT. The method also includes coupling a program specific module (PSM) to the UUT. Each PSM is configured to couple to a specific type of UUT to provide power and telemetry to the specific type of UUT. The method further includes a robot arm moving the UUT to the selected test station. The method still further includes conducting the first functionality test on the UUT at the selected test station.

20 Claims, 28 Drawing Sheets

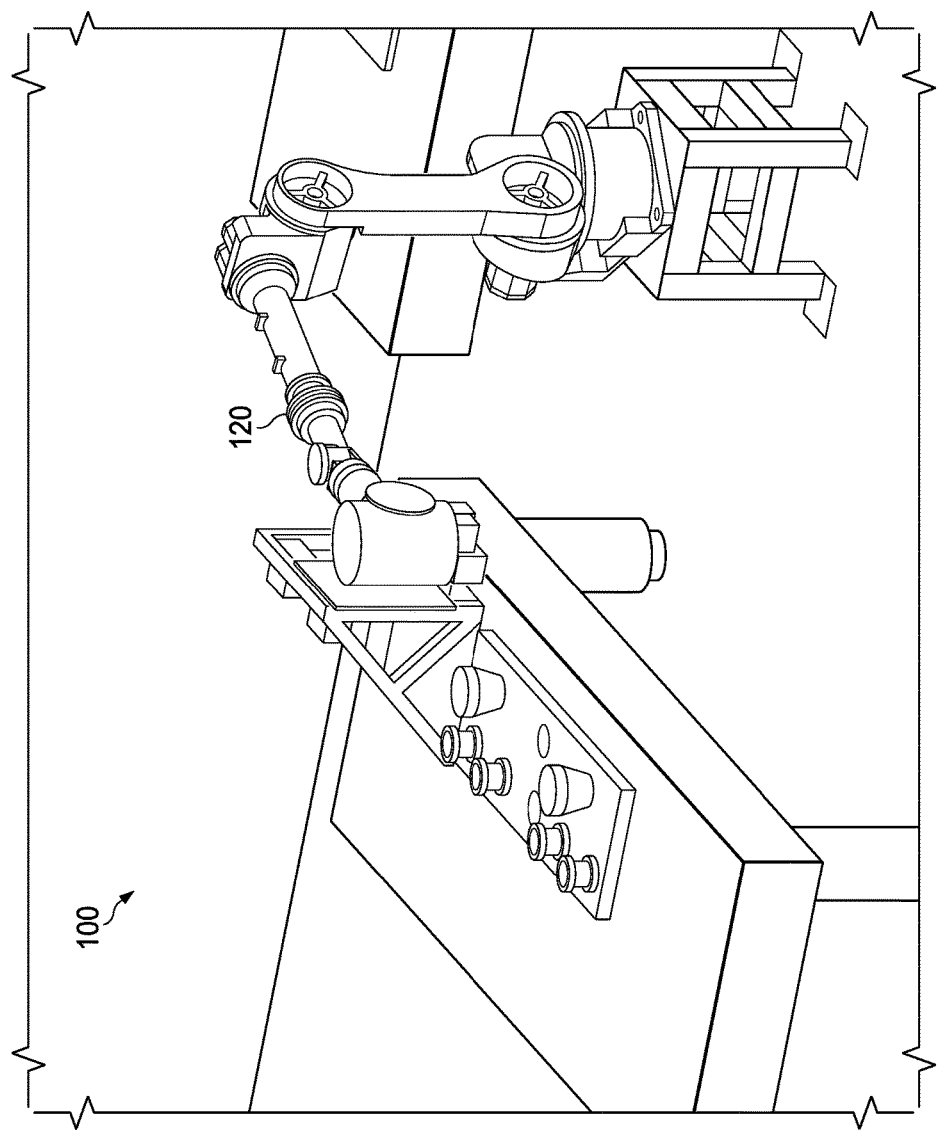

18-POSITION IMU CHARACTERIZATION TEST

1200

$\gamma_I = \phi \quad \gamma_M = \theta + 90° \quad \gamma_O = \psi$

| POSITION | $\phi$ | $\theta$ | $a_x$ | $a_y$ | $a_z$ | $\omega_x$ | $\omega_y$ | $\omega_z$ |
|---|---|---|---|---|---|---|---|---|
| 1 | 0 | 0 | 0 | 0 | -g | 0 | 0 | $\dot{\psi}$ |
| 2 | 45 | 0 | 0 | -g/√2 | -g/√2 | 0 | $\dot{\psi}$/√2 | $\dot{\psi}$/√2 |
| 3 | 90 | 0 | 0 | -g | 0 | 0 | $\dot{\psi}$ | 0 |
| 4 | 135 | 0 | 0 | -g/√2 | g/√2 | 0 | $\dot{\psi}$/√2 | -$\dot{\psi}$/√2 |
| 5 | 180 | 0 | 0 | 0 | g | 0 | 0 | -$\dot{\psi}$ |
| 6 | 225 | 0 | 0 | g/√2 | g/√2 | 0 | $\dot{\psi}$/√2 | -$\dot{\psi}$/√2 |
| 7 | 270 | 0 | 0 | g | 0 | 0 | -$\dot{\psi}$ | 0 |
| 8 | 315 | 0 | 0 | g/√2 | -g/√2 | 0 | $\dot{\psi}$/√2 | $\dot{\psi}$/√2 |
| 9 | 360 | 45 | g/√2 | 0 | -g/√2 | -$\dot{\psi}$/√2 | 0 | $\dot{\psi}$/√2 |
| 10 | 360 | 90 | g | 0 | 0 | -$\dot{\psi}$ | 0 | 0 |
| 11 | 360 | 135 | g/√2 | 0 | g/√2 | -$\dot{\psi}$/√2 | 0 | -$\dot{\psi}$/√2 |
| 12 | 360 | 225 | -g/√2 | 0 | g/√2 | $\dot{\psi}$/√2 | 0 | -$\dot{\psi}$/√2 |
| 13 | 360 | 270 | -g | 0 | 0 | $\dot{\psi}$ | 0 | 0 |
| 14 | 360 | 315 | -g/√2 | 0 | -g/√2 | $\dot{\psi}$/√2 | 0 | $\dot{\psi}$/√2 |
| 15 | 270 | 315 | -g/√2 | g/√2 | 0 | $\dot{\psi}$/√2 | -$\dot{\psi}$/√2 | 0 |
| 16 | 270 | 225 | -g/√2 | -g/√2 | 0 | $\dot{\psi}$/√2 | $\dot{\psi}$/√2 | 0 |
| 17 | 270 | 135 | -g/√2 | -g/√2 | 0 | -$\dot{\psi}$/√2 | $\dot{\psi}$/√2 | 0 |
| 18 | 270 | 45 | g/√2 | g/√2 | 0 | -$\dot{\psi}$/√2 | -$\dot{\psi}$/√2 | 0 |

FIG. 12

DYNAMIC TESTING OF ATTITUDE DETERMINATION AND CONTROL SYSTEMS, REACTION WHEEL AND TORQUE RODS USING AUTOMOTIVE ROBOTIC TECHNIQUES

TECHNICAL FIELD

The present disclosure is directed in general to fully automated test equipment for spacecraft and aircraft.

BACKGROUND OF THE DISCLOSURE

When production costs for a product require large sums of money, the purchaser may demand documented proof that the product can provide top-notch performance over a long lifespan. Production includes manufacturing, quality control testing, and performance testing. In the field aerospace, satellite production is expensive (e.g., on order from $300 M-1 B per satellite). The expected lifespan of a satellite is about 25 years. A satellite manufacturer must generate documented proof that each satellite complies with numerous rigorous quality control specifications. Testing each satellite for compliance with each quality control specification and each performance specification contributes to the large cost.

Demand for satellite fabrication is low, such that a request for production may include, e.g., only 1, 5, or 20 satellites. Also, the demand for satellite fabrication is intermittent, such that years may pass between requests for production. Consequently, manufacturers go in and out of business between requests for production. The technology applicable for use on satellites develops rapidly. Each request for production of a satellite is different, such that a manufacturer's tools for meeting a first request for production are not well suited for meeting a subsequent request for production. The combination of intermittent low-volume demand for a product and rapidly changing technology does not provide an incentive for the aerospace industry to develop automation tools to satellite production. A satellite manufacturer uses hand built processes and spends approximately 5 years to build a satellite. Without automation, production standards for spacecraft are lacking. Without a sufficient volume of demand, manufacturing standards for spacecraft are lacking.

SUMMARY OF THE DISCLOSURE

To address one or more of the above-deficiencies of the prior art, one embodiment described in this disclosure provides a method for testing functionality of a spacecraft or aircraft unit under testing (UUT). The method includes selecting a test station at which to conduct a first functionality test on the UUT. The method also includes coupling a program specific module (PSM) to the UUT. Each PSM is configured to couple to a specific type of UUT to provide power and telemetry to the specific type of UUT. The method further includes a robot arm moving the UUT to the selected test station. The method still further includes conducting the first functionality test on the UUT at the selected test station.

Another embodiment provides a system for testing functionality of a unit under testing (UUT). The system includes a control unit configured to: select a first test station at which to conduct a first functionality test on the UUT, and control the system to conduct the first functionality test on the UUT at the selected first test station. The system includes a program specific module (PSM) configured to couple to the UUT. Each PSM is configured to couple to a specific type of UUT to provide power and telemetry to the specific type of UUT. The system includes a robot arm configured to move the UUT to the selected first test station.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 9A and 9B, 10A and 10B, and 11A and 11B illustrate the spacecraft testing system of FIG. 1 using the robot arm to traverse the spacecraft through a sequence of spatial positions to conduct a functionality test according to embodiments of the present disclosure;

FIG. 12 illustrates a table for an 18-position IMU characterization test;

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 17:
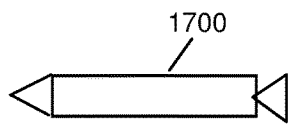
FIG. 17 illustrates an example missile.

To increase the volume of products the satellite manufacturer's tools are used to test, embodiments of the present disclosure employ a mix of products into rate. Eighty percent of the functionality testing required for satellites overlap with functionality testing required for missiles. Embodiments of the present disclosure include wide range test equipment that allows testing of a variety of satellites using the same test equipment used to test a variety of types of missiles. That is, embodiments of the present disclosure include test equipment having a test range that is not limited to testing a single type of spacecraft, but instead well suited for precision testing of a variety of types of units (missile aircrafts and/or spacecrafts, such as a missile 1700 shown in FIG. 17). As a result, embodiments of the present disclosure enable a spacecraft manufacturer to use production standards from missile lines and distributed test and automation via fully automated (no human) lines. Increasing the volume of products provides an incentive for a satellite manufacturer to automate satellite production, which reduces time and increases return on investment.

Twenty percent of the functionality testing required for satellites does not overlap with functionality testing required for missiles. For example, a satellite has solar panels and a star tracker, but a missile does not. To reduce the cost of testing satellites, embodiments of the present disclosure enable a robot to perform testing on the 20% of functions of a satellite that are not on a missile. Full automation reduces risk to hardware, by reducing dropping or other damage to hardware caused by human error.

Figure 1:
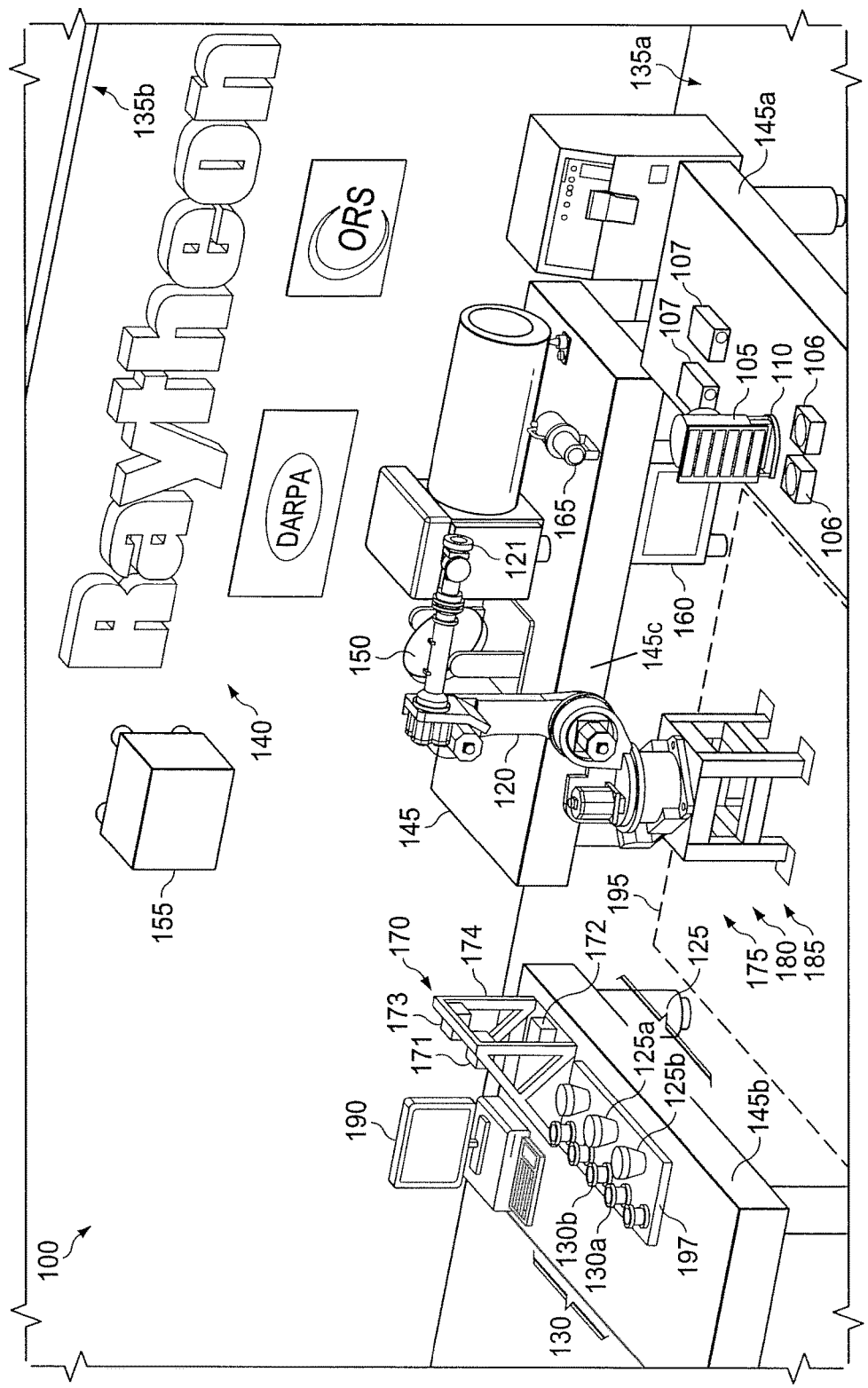
FIG. 1 illustrates a spacecraft testing system according to embodiments of the present disclosure.

FIG. 1 illustrates a spacecraft testing system according to embodiments of the present disclosure. The spacecraft testing system 100 is configured to test multiple functions of a variety of spacecraft 105-107. The spacecraft testing system 100 has an agnostic test capability (ATC). The embodiment of the spacecraft testing system 100 shown in FIG. 1 is for illustration only. Other embodiments could be used without departing from the scope of this disclosure.

The spacecraft testing system 100 includes a docking station 110, a robot arm 120, multiple program specific modules (PSM) 125a-125b (collectively, PSMs 125), multiple agnostic test tools (ATT) 130, and multiple test stations. The spacecraft testing system 100 is arranged in a test area, such as a room including various surfaces, including floor 135a and ceiling 135b surfaces spanning horizontally, a wall surface 140 spanning vertically between the floor 135a and the ceiling 135b, and elevated horizontally spanning surfaces 145 of each of the multiple test benches 145a-145c. This disclosure describes embodiments in the context of a room, but this disclosure is not confined to a room as the test area. Other test areas may not include a test bench, a ceiling, or a wall. The multiple test stations of the spacecraft testing system 100 are disposed on (for example, resting weight on) one or more of the surfaces 135a, 140, 145 in the room. As shown, the multiple test stations include an optical test station 150, a Flat Field testing station 155; a solar load test station 160; star field generator test station 165; wall of sources test station 170; a six degrees of freedom (6 DOF) motion test station 175; a Run weight/CG 3 axes test station 180; and the run torque measure of RW in 3 axes test station 185. The spacecraft testing system 100 also includes a control unit 190 that controls the functions of the other components within the spacecraft testing system 100.

This disclosure describes embodiments in the context of testing a UUT that is the SeeMe spacecraft 105, but this disclosure is not limited to testing the spacecraft 105 as the UUT. The spacecraft testing system 100 is configured to test other types of spacecraft (for example, a Phoenix highly integrated satlet 106, an operationally responsive space 6U cube satellite dispenser 107 (ORS 6U), or a CubeSat) without departing from the scope of this disclosure. The spacecraft 105 includes an attitude determination and control system (ADCS), on-board IMUs, on-board star trackers (visible in FIG. 5A, adjacent to the reaction wheels 108), on-board magnetometers, a set of reaction wheels 108 (visible in FIG. 5A), a torque rods, a propulsion module, a magnet, a compass, solar panel, a camera, and test interface.

The ADCS of the spacecraft 105 informs the control unit 190 of the direction the spacecraft 105 is pointed in space, and the control unit 190 uses this direction information to control movement of the satellite from its location and orientation. For example, the control unit 190 sends control signals to the reaction wheels 108 of the spacecraft 105, torque rods, and propulsion module based on the direction information.

The camera includes a primary set of optics that capture images of the Earth from orbit. A star tracker includes a secondary set of optics that capture images of the stars while the spacecraft 105 is in orbit.

The star tracker determines the orientation and location of the spacecraft 105 in orbit based on the intensities and pattern of stars in the captured images.

The test interface of the spacecraft 105 is configured to directly connect to an end effector 121 of the robot arm 120. The test interface of the spacecraft 105 is additionally configured to directly connect to an electromechanical interface of the ATT. For example, the test interface of the spacecraft 105 can include a female interface for coupling with a male interface.

The docking station 110 is disposed on a first test bench 145a. The docking station 110 holds the unit undergoing testing (UUT), namely, the spacecraft 105. In certain embodiments, the docking station 110 is configured to hold a specified type of space craft, such as a Space Enabled Effects for Military Engagements (SeeMe) spacecraft. In certain embodiments, the docking station is a universal type docking station capable of holding a variety of spacecraft, not only a SeeMe spacecraft 105, but additionally, a highly integrated satlet (HiSAT) 106 and an ORS 6U 107.

Figure 13:
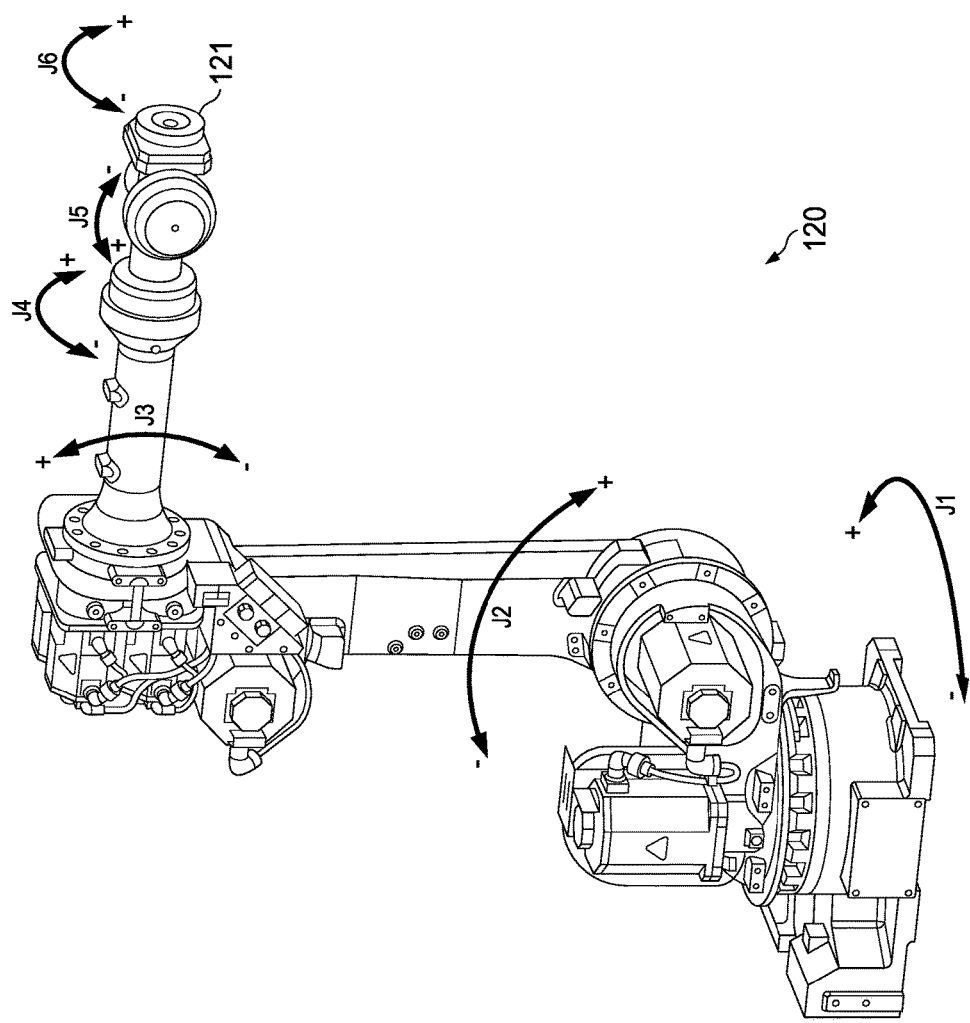
FIG. 13 illustrates the robot arm of FIG. 1 in more particular detail.

The robot arm 120 includes an end effector 121 and multiple (e.g., six) rotational joints that move the end effector 121 into various locations and orientations in the test area. The end effector 121 is configured to electrically and fluidly (e.g., via a gas connection) couple to a PSM 125. The robot arm 120 is mounted to the floor 135a. A 3 dimensional (3D) clear space 195 (shown as the space within a perimeter of the 3D clear space) surrounds the robot arm 120. The 3D clear space is bounded by the floor 135a at the bottom, the ceiling 135b at the top, and by the perimeter (shown as a dotted line) at the sides. FIG. 13 shows the robot arm 120 in more particular detail.

As a technical advantage, the robot arm 120 replaces manual labor used to move a satellite from one test station to the next test station, and through various positions in each and every functionality test. As a result, the robot arm 120 reduces risk of hardware damage and risk of electrostatic discharge (ESD) damage to the satellite UUT due to dropping the satellite by human error or human touch. As a technical advantage, the robot arm 120 enables more efficient use of the 3D space within the test area by an ability to lift the spacecraft 105 to heights that are not easily accessible to a human standing on the floor. As a result, test equipment at the multiple test stations in the spacecraft testing system 100 does not have to be accessible to the ground or within the reach of a human.

Each program specific module 125 is arranged in an array on the surface of the second test bench 145*b*. As shown, three PSMs 125 are arranged in a 1×3 array. The PSM 125 includes a first interface configured to electrically and mechanically couple to the robot arm 120. The PSM 125 includes a second interface configured to electrically and mechanically couple directly to the test interface of the UUT or to an interface of a ATT 130. The PSM 125 functions as an adapter. That is, each PSM 125 is configured to convertibly translate power and communications that are normally part of the robot arm format into the exact power format and communication format needed to control the UUT. Each PSM 125 is configured to provide power to, run bi-directional telemetry from the control unit 190 through robot arm 120 to, and conduct tests on a specific type of spacecraft. More particularly, each PSM 125 is configured to conduct a set of functionality tests that correspond to the functions of the specific type of spacecraft. For example, a first PSM 125*a* is configured to conduct tests on a Space Enabled Effects for Military Engagements (SeeMe) spacecraft, but may not be well suited to conduct tests on other types of spacecraft, such as non-SeeMe spacecraft 106-107. As another example, a second PSM 125*b* is configured to conduct tests on non-SeeMe spacecraft (such as the Phoenix HiSAT 106), but may not be well suited to conduct tests on other types of spacecraft, such as a SeeMe spacecraft 105. Also, each PSM 125 is configured to conduct a specific set of tests. For example, the first PSM 125*a* is configured to conduct tests on a SeeMe spacecraft at a first subset of the test stations in the room. The first subset of test stations include the optical test station 150, the Flat Field testing station 155, the solar load test station 160, the star field generator test station 165, and the wall of sources test station 170. The first PSM 125*a* must couple to an ATT 130 to conduct tests at a second subset of the test stations in the room. The second subset of test stations include the 6 DOF motion test station 175, the Run weight/CG 3 axes test station 180, and the run torque measure of RW in 3 axes test station 185. The first PSM 125*a* may not be well suited to conduct tests at a third subset of the test stations in the room. The third subset of test stations include other test stations in the room, and can include test stations for testing functions absent from the type of spacecraft the first PSM 125*a* is configured to test.

Each ATT 130 is arranged in an array on the surface of the second test bench 145*b*. As shown, five ATTs 130 are arranged in a 1×5 array. Each ATT 130 is configured to test a specific function of a spacecraft. For example, a first ATT 130*a* is configured to conduct a 6 DOF motion test at the 6 DOF motion test station 175, and a second ATT 130*b* is configured to conduct a Run weight/CG 3 axes test at the Run weight/CG 3 axes test station 180. However, the first ATT 130*a* may not be well suited for conducting a Run weight/CG 3 axes test, and the second ATT 130*b* may not be well suited for conducting a 6 DOF motion test.

In certain embodiments, the spacecraft testing system 100 includes a tray 197 for holding the PSMs 125 and ATTs 130 upright in a position for easily coupling to the robot arm 120. As shown, the second interface of the PSMs 125 is physically in contact with the top surface of the tray 197, and the first interface of the PSMs 125 faces up to the ceiling 135*b*.

The optical testing station 150 (Gravity friendly MTF/Focus Test (Vis/NIR/LWIR)) is disposed on the surface of the third test bench 145*c*. The test equipment at the optical testing station 150 performs an optical imaging functionality test to measure the ability of the optics of the camera of the spacecraft 105 to resolve image content at various resolutions. The test equipment at the optical testing station 150 includes a modulation transfer function (MTF) target generator that generates an MTF target, and a fold mirror that receives the MTF target and reflects the image of the MTF target into the optics of the camera of the spacecraft 105.

The Flat Field testing station 155 includes non-uniformity correction (NUC) test equipment configured calibrate the detector of the spacecraft 105. The NUC test equipment performs a detector calibration functionality test to measure and flatten out error within the detector of the optics of the spacecraft 105. The Flat Field testing station 155 is a ceiling-mounted test station. That is, the Flat Field testing station 155 is mounted to the ceiling 135*b* of the room. In certain embodiments, such as in the example shown in FIG. 1, the Flat Field testing station 155 is mounted close to the ceiling 135*b* Or touching the ceiling 135*b*. That is, the Flat Field testing station 155 is mounted to the wall 140 as a wall-mounted test station.

The solar load test station 160 is disposed on the floor 135*a*. The solar load test equipment at the test station 160 conducts a solar loading functionality test to measure the abilities of solar panels of a spacecraft to receive and convert a full load of solar energy into electrical energy for an on-board battery while receiving a thermal load. The solar load test equipment includes a high intensity light source to illuminate the solar panels, and a thermal energy lamp to provide a full thermal load as would be received in space. As shown, the solar load test equipment is OFF (shown by the black rectangle within the housing of the solar load test equipment). When turned ON, the solar load test equipment emits a bright light having 1300 Watts/meter-squared (W/m$^2$) of irradiance. The spacecraft testing system 100 can also perform a battery charging functionality test at the solar load test station 160 to determine the charging speed, energy storage level, and energy drainage rate at various thermal loads and solar loads.

The star field test station 165 is disposed on the surface of the third test bench 145*c*. The test equipment of the star field test station 165 includes a star field generator for testing the functionality of the star tracker of the spacecraft 105. For example, during the star tracker functionality test, the start field generator generates a small piece of the sky, such as the Orion constellation. The control unit 190 receives information from the star tracker of the spacecraft 105 indicating the ability to determine intensities of stars and distributions between stars. Next, the robot 120 simulates a precise amount of drift (e.g., slow drift from a degree to another degree) by traversing the spacecraft 105 with reference to the constellation. The control unit 190 uses the movement of the robot arm and received information from the star tracker of the spacecraft 105 to determine a change in the accuracy of the star tracker based on the drift.

The wall of sources test station 170 is disposed on the surface of the second test bench 145*b*. The wall of sources test station 170 includes a variety of types of test equipment, such as: a magnetometer test equipment 171 including a magnet for testing the functionality of the magnetometer within the spacecraft 105, a Torque Rod Field test equipment 172 including a magnetometer for testing the functionality of torque rods within the spacecraft 105; and a GPS test equipment 173, which may be a GPS transmitter/receiver. Each test equipment is coupled to (e.g., connected to) a bracket 174.

The magnetometer of the spacecraft 105 measures the Earth's magnetic field to determine the location of the spacecraft 105 with reference to Earth. The magnet 171 excites to affect the magnetometer of the spacecraft 105. During the magnetometer functionality test, the control unit 190 the compares magnetometer measurements of the spacecraft affected by both Earth's magnetism and the excitation of the magnet 171 to magnetometer measurements of the spacecraft affected by only Earth's magnetism.

The magnetometer 172 performs a torque rod functionality test by measuring the intensity and direction of magnetic field emitted from the torque rod of the spacecraft 105. During the torque rod functionality test, the robot arm 120 rotates the spacecraft 105 into a first orientation, so that the first torque rod is nearest the magnetometer 172. The magnetometer 172 measures the magnetic field emitted from the first torque rod. The control unit 190 controls the spacecraft 105 to apply various amounts of current (e.g., varying over the entire range of operation for the torque rod) to the first torque rod. The robot arm 120 rotates the spacecraft into subsequent orientations so that each of the second and third torque rods of the spacecraft is nearest the magnetometer 172. The system 100 executes another iteration of the torque rod functionality test for the subsequent torque rod. The torque rods are described more particularly below, in reference to FIG. 15C.

The GPS test equipment 173 tests the functionality of the GPS within the spacecraft 105 by transmitting a GPS signal to the spacecraft 105, receiving a response GPS signal from the GPS transceiver of the spacecraft 105, and comparing the receiving signal to the transmitted GPS signal.

The 6 DOF motion test station 175 (i.e., Run 6 Axis IMU Test to compare to IMU tool) includes a portion of a 3 dimensional (3D) clear space in the room with clearance for moving the spacecraft through a sequence or series of positions without colliding with or engaging test equipment at other test stations. The 6 DOF motion test station 175 tests the IMU. The 3D clear space for the 6 DOF motion test station 175 is disposed within the 3D clear space 195.

The Run weight/CG 3 axes test station 180 (i.e., Run Weight/CG Test in 3 Axes) is a 3D clear space in the room with clearance for moving the spacecraft through a sequence or series of positions without colliding with or engaging test equipment at other test stations. The 3D clear space for the Run weight/CG 3 axes test station 180 is disposed within the 3D clear space 195. Also, the 3D clear space for the Run weight/CG 3 axes test station 180 can overlap the 3D clear space for the 6 DOF motion test station 175.

The run torque measure of RW in 3 axes test station 185 (Run Torque Measure of RW in 3 Axes) is a 3D clear space in the room with clearance for moving the spacecraft through a sequence or series of positions without colliding with or engaging test equipment at other test stations. The 3D clear space for the run torque measure of RW in 3 axes test station 185 is disposed within the 3D clear space 195. The 3D clear space for the run torque measure of RW in 3 axes test station 185 can overlap the 3D clear space for the Run weight/CG 3 axes test station 180 or the 6 DOF motion test station 175. More particularly, the 3D clear space for the run torque measure of RW in 3 axes test station 185 can include a different portion of the 3D clear space 195 than the portions for the test stations 175 and 180.

The control unit 190 could, for instance, include at least one processor, microprocessor, microcontroller, field programmable gate array (FPGA), application specific integrated circuit (ASIC), or other processing or control device. The control unit 190 can include executable instructions stored in a machine-usable, computer-usable, or computer-readable medium in any of a variety of forms, wherein the instructions, when executed, cause the processing circuitry to perform operations for dynamic testing of attitude determination and control systems, reaction wheel and torque rods using automotive robotic techniques.

Figure 2:
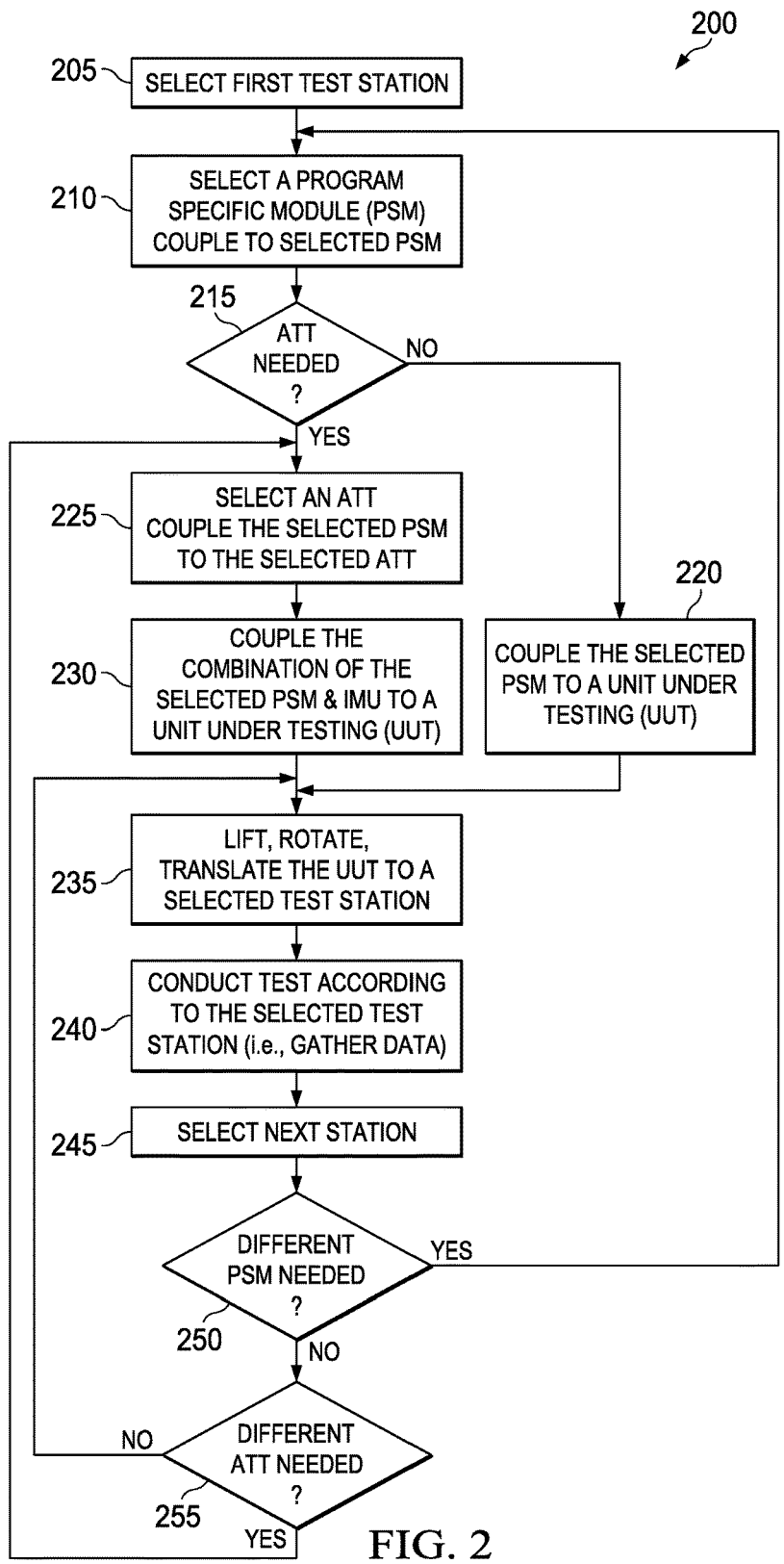
FIG. 2 illustrates a method of dynamic testing of attitude determination and control systems, reaction wheel and torque rods using automotive robotic techniques according to embodiments of the present disclosure.

FIG. 2 illustrates a method of dynamic testing of attitude determination and control systems, reaction wheel and torque rods using automotive robotic techniques according to embodiments of the present disclosure. The method 200 may be implemented by the spacecraft testing system 100, or by any other suitable system. During implementation of the method 200, the spacecraft testing system 100 conducts various functional tests on a UUT, such as the spacecraft 105. The embodiment of the method 200 shown in FIG. 2 is for illustration only. Other embodiments could be used without departing from the scope of this disclosure.

In block 205, a controller selects a first test station for testing the spacecraft 105 UUT. More particularly, the controller can select the first test station from a list of multiple test stations in the test area. The controller can select the first test station by selecting a functionality test to conduct. Each functionality test corresponds to one test station. The controller can select a functionality test from a list of multiple functionality tests. By selecting the functionality test, the controller consequently selects the test station that corresponds to the selected functionality test. As a particular example, the controller selects to test the functionality of the earth imaging unit of the spacecraft 105. As the optical test station 150 is configured to test earth imaging units, consequently, the controller selects the optical test station 150 as the first test station, at which the selected functionality test will be conducted.

In certain embodiments of the method 200, block 210 includes a process of selecting a functionality test to be conducted. One or more functionality tests can be conducted at a single test station. If only one functionality test can be conducted at the selected first test station, then by selecting the first test station, the controller consequently selects a functionality test to be conducted on the spacecraft 105. If more than one functionality test can be conducted at the selected first test station, then by selecting the first test station, the controller selects from a short list to determine a functionality test to conduct at the first test station. The short list includes the multiple functionality tests that correspond to the selected first test station.

In block 210, the controller selects a PSM 125 to couple to the robot arm 120. Also in block 210, the robot arm 120 selectively couples to a first interface of the selected PSM 125. More particularly, the controller can select the PSM 125 from a list of PSMs disposed in the test area, or the controller can select a PSM 125 based on a selected type of UUT. The list of PSMs can include a variety of types of PSMs. Each type of PSM 125 corresponds one-to-one to a type of UUT. For example, as the first PSM 125*a* is configured to couple to the SeeMe spacecraft, the SeeMe spacecraft corresponds to the first PSM 125*a*. As a particular example, the controller selects to test the spacecraft 105, which is a SeeMe spacecraft. Consequently, the controller selects the first PSM 125*a* to couple to the robot arm 120. That is, the controller selected the first PSM 125a based on a selection of a type of UUT to be tested.

In a subsequent iteration of block 210, a subsequent PSM is selected based on the type of UUT to be tested at the next test station. The previous PSM is exchanged for a subsequently selected PSM. More particularly, the robot drives the previous PSM to the tray 197 and releases the previous PSM back into the array of PSMs. The robot arm 120 couples to a first interface of the subsequently selected PSM.

In certain embodiments of the method 200, block 210 includes a process of selecting a spacecraft to undergo testing. The controller can select a type of UUT to be tested based on a selected PSM 125. The controller can select a spacecraft to test from a list of spacecraft in the room. The list of spacecraft in the room can include one spacecraft 105 (as shown in FIG. 1); multiple spacecraft of a single type; a variety of types of spacecraft having a common quantity; or a variety of types of spacecraft having different quantities. As a particular example, the controller selects the first PSM 125a. Consequently, the controller selects a SeeMe spacecraft as the type of UUT to test. That is, the controller selects to test the SeeMe spacecraft 105 based on a selection of a PSM corresponding to the SeeMe spacecraft.

In block 215, the controller determines whether an ATT is needed for conducting tests at the first test station selected in block 205. More particularly, the controller determines whether an ATT is needed for conducting the functionality test selected in block 205. Based on the selected functionality test, when the controller determines that an ATT is not needed, the method proceeds to block 220. When the controller determines that an ATT is needed, the method 200 proceeds to block 225.

In block 220, the selected PSM couples to a UUT. More particularly, the selected PSM that coupled to the robot arm 120 in block 210 also couples to a UUT. As a particular example, the robot arm 120 selectively couples to a first interface of the first PSM 125a, and then the robot arm 120 drives the second interface of the first PSM 125a to couple to the spacecraft 105.

In block 225, the controller selects an ATT to couple to the PSM selected in block 210. Also in block 225, the selected PSM couples to the selected ATT. More particularly, the robot arm 120 drives the second interface of the first PSM 125a to couple to the selected ATT. Each ATT corresponds to one functionality test. As the first ATT 130a is configured to conduct a 6 DOF motion functionality test at the 6 DOF motion test station 175, a selection of the 6 DOF motion functionality test corresponds to the first ATT 130a. As a particular example, the controller selects to conduct the 6 DOF motion functionality test on the SeeMe spacecraft 105. Consequently, the controller selects to couple the first PSM 125a to a first interface of the first ATT 130a based on a selection of a functionality test. In block 230, the robot arm 120 drives the second interface of the first ATT 130a to couple to the spacecraft 105.

In block 230, the combination of the selected PSM and the selected ATT couples to a UUT. More particularly, a second interface of the selected ATT that connected to the selected PSM in block 225 couples the selected UUT. That is, the selected PSM is coupled between the robot arm 120 and the selected ATT, and the selected ATT is coupled between the selected PSM and the spacecraft 105 UUT. As a particular example, the robot arm 120 drives the second interface of the first ATT 130a to couple to the spacecraft 105 UUT.

In block 235, the robot arm 120 lifts, rotates, and translates the UUT to a selected test station. More particularly, the robot arm 120 drives the spacecraft 105 to the test station selected in block 205 (for a first iteration of the method 200) or block 245 (for a subsequent iteration of the method 200).

In block 240, the spacecraft testing system 100 conducts a test at the selected test station. More particularly, the spacecraft testing system 100 conducts a selected functionality test at the selected test station. The controller receives and processes data from sensors in the spacecraft testing system 100.

In block 245, the controller selects a next test station. For example, the controller implements a process similar to the process executed in block 205. More particularly, the controller selects a functionality test to be conducted at the next test station.

In block 250, the controller determines whether a different PSM is needed for the selected test station, namely, the next test station. More particularly, the controller determines whether a different PSM is needed based on a determination of whether a different spacecraft will be tested at the next test station selected in block 245. If the first selected spacecraft 105 will be tested at the next test station, then the same PSM is needed, and the method 200 proceeds to block 255. If a different PSM is needed, then the method 200 proceeds to block 210.

In block 255, the controller determines whether a different ATT is needed. More particularly, the controller determines whether a different ATT is needed to conduct the functionality test selected in block 245. Based on the selected functionality test, if a different ATT is needed, then the method 200 proceeds to block 225 to exchange PSMs. If the same ATT is needed, then the method 200 proceeds to block 235 to drive the spacecraft 105 to the next test station.

Figure 3:
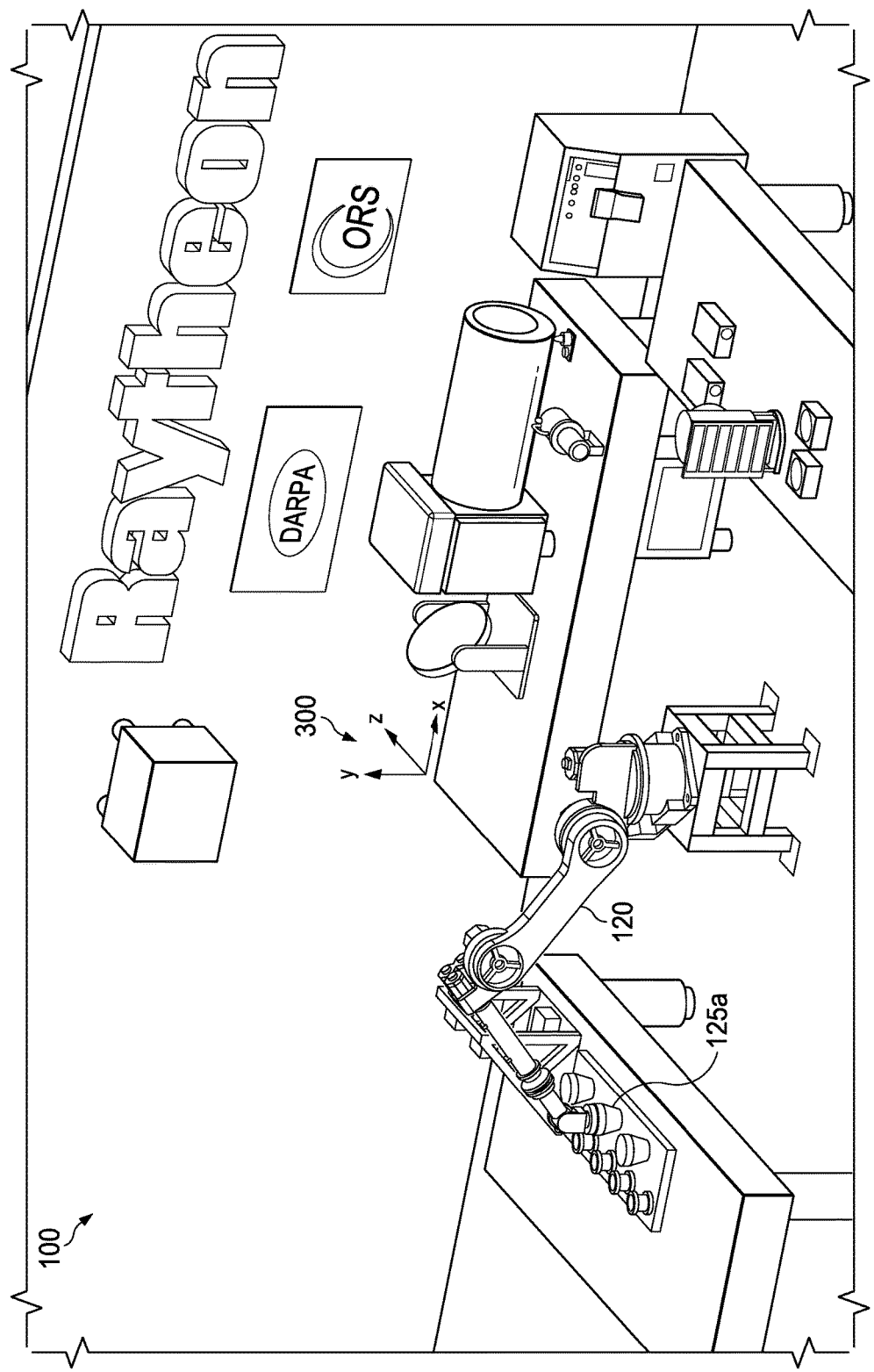
FIG. 3 illustrates the spacecraft testing system of FIG. 1 selectively coupling a robot arm to a program specific module according to embodiments of the present disclosure.

FIG. 3 illustrates the spacecraft testing system 100 of FIG. 1 selectively coupling a robot arm to a program specific module, such as described in the process block 210, according to embodiments of the present disclosure. The implementation of the process block 210 shown in FIG. 3 is for illustration only. Other embodiments could be used without departing from the scope of this disclosure. As shown, the robot arm 120 drives its electromechanical interface vertically downward to press against the first interface of the first PSM 125a to electrically and mechanically couple to the first PSM 125a.

In the present disclosure, the 3-axes coordinates 300 denote orientation. The x-axis represents the horizontal direction, the y-axis represents the vertical direction, and the z-axis represents the depth direction.

Figure 4:
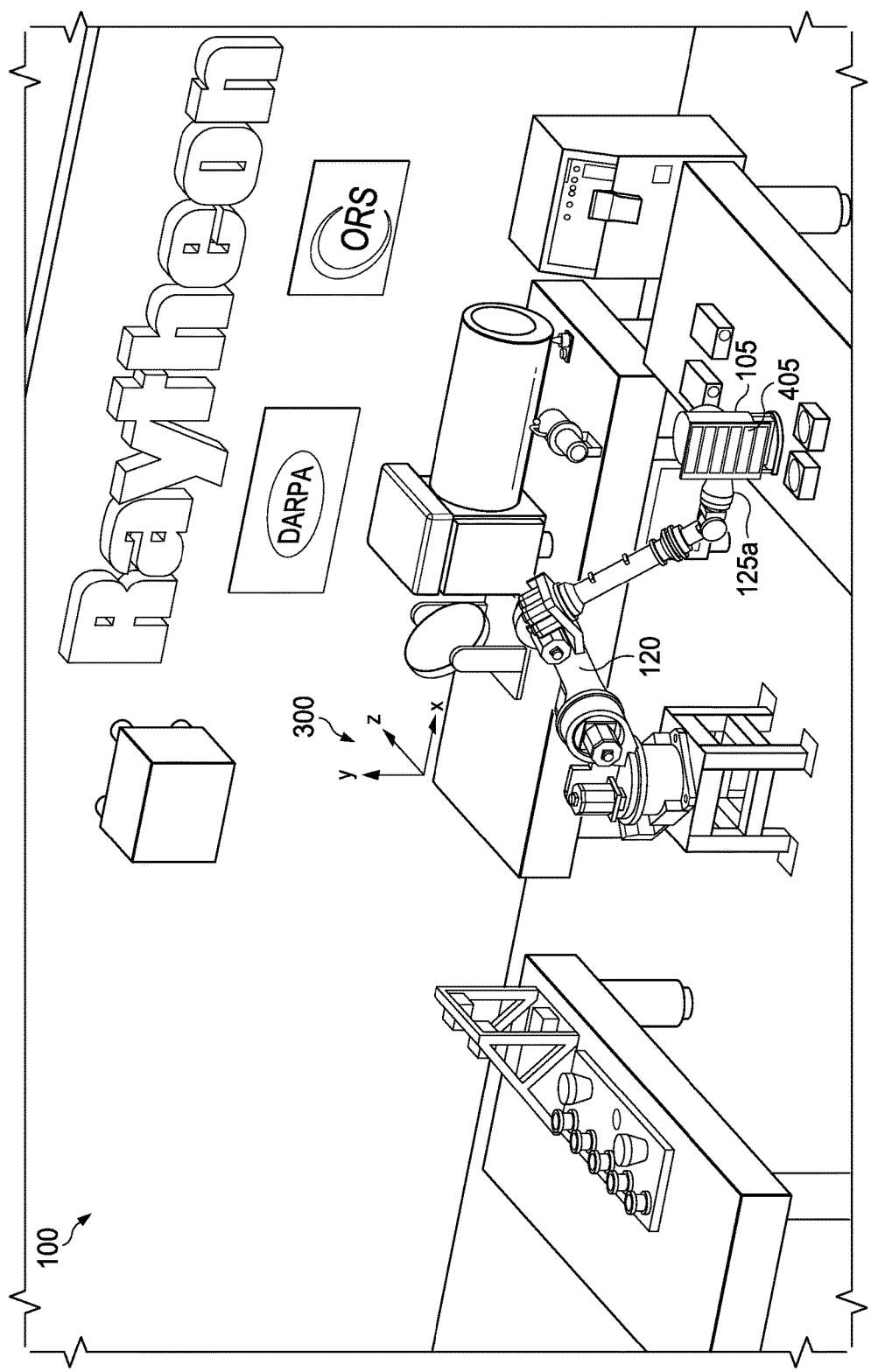
FIG. 4 illustrates the spacecraft testing system of FIG. 1 coupling the robot arm to a second interface of a PSM to a test interface of a spacecraft according to embodiments of the present disclosure.

FIG. 4 illustrates the spacecraft testing system of FIG. 1 coupling the robot arm to a second interface of a PSM to a test interface of a spacecraft, such as described in the process block 220, according to embodiments of the present disclosure. The implementation of the process block 220 shown in FIG. 4 is for illustration only. Other embodiments could be used without departing from the scope of this disclosure.

As shown, the robot arm 120 drives the second interface of the first PSM 125a horizontally to press against the test interface of the spacecraft 105. By pressing the two interfaces against each other, the second interface of the first PSM 125a electrically and mechanically couples to the test interface of the spacecraft 105. That is, the spacecraft 105 receives electrical energy through the robot arm 120 and PSM 125a.

When the spacecraft 105 is in the docking station 110, a solar panel 405 is oriented according to the negative z-axis.

FIGS. 5A-5E illustrate the spacecraft testing system of FIG. 1 using the robot arm to drive the spacecraft to different test stations by lifting, rotating, and translating the spacecraft UUT, such as described in the process block 235, according to embodiments of the present disclosure. The implementation of the process block 235 shown in FIGS. 5A-5E is for illustration only. Other embodiments could be used without departing from the scope of this disclosure.

Figure 5A:
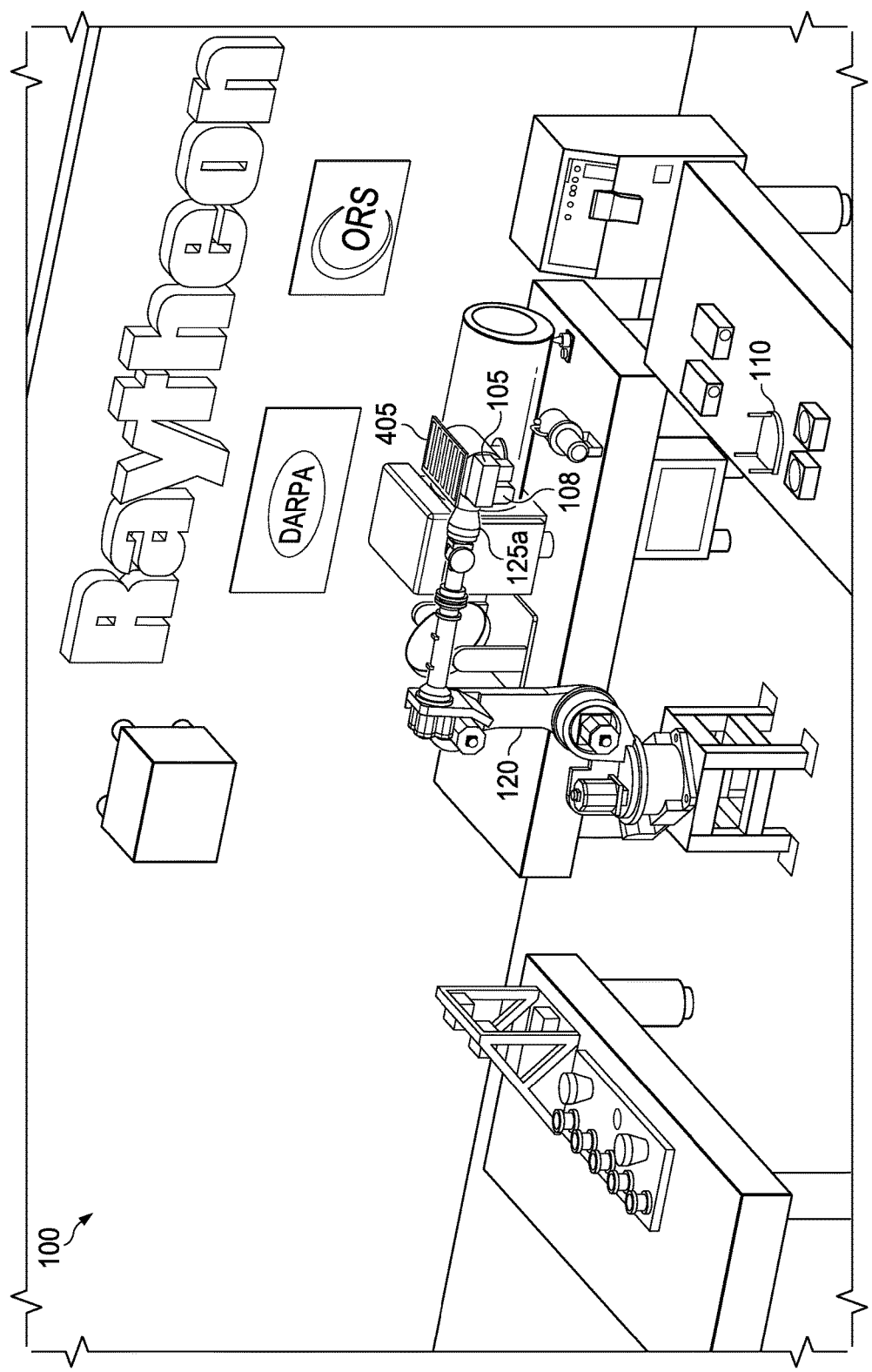
FIGS. 5A-5E illustrate the spacecraft testing system of FIG. 1 using the robot arm to drive the spacecraft to different test stations by lifting, rotating, and translating the spacecraft UUT according to embodiments of the present disclosure.

FIG. 5A illustrates the spacecraft testing system of FIG. 1 using the robot arm 120 to lift and rotate the spacecraft 105 from the bench-level docking station 110. The robot arm 120 lifts the spacecraft 105 (in the direction of the positive y-axis) so that the bottom of the spacecraft 105 is no longer in contact with the docking station 110, but instead is hovering within the clear space 195, and rotates the spacecraft 105 (in positive z and negative y axis directions) so that the solar panel 405 is oriented according to the positive y-axis.

Figure 5B:
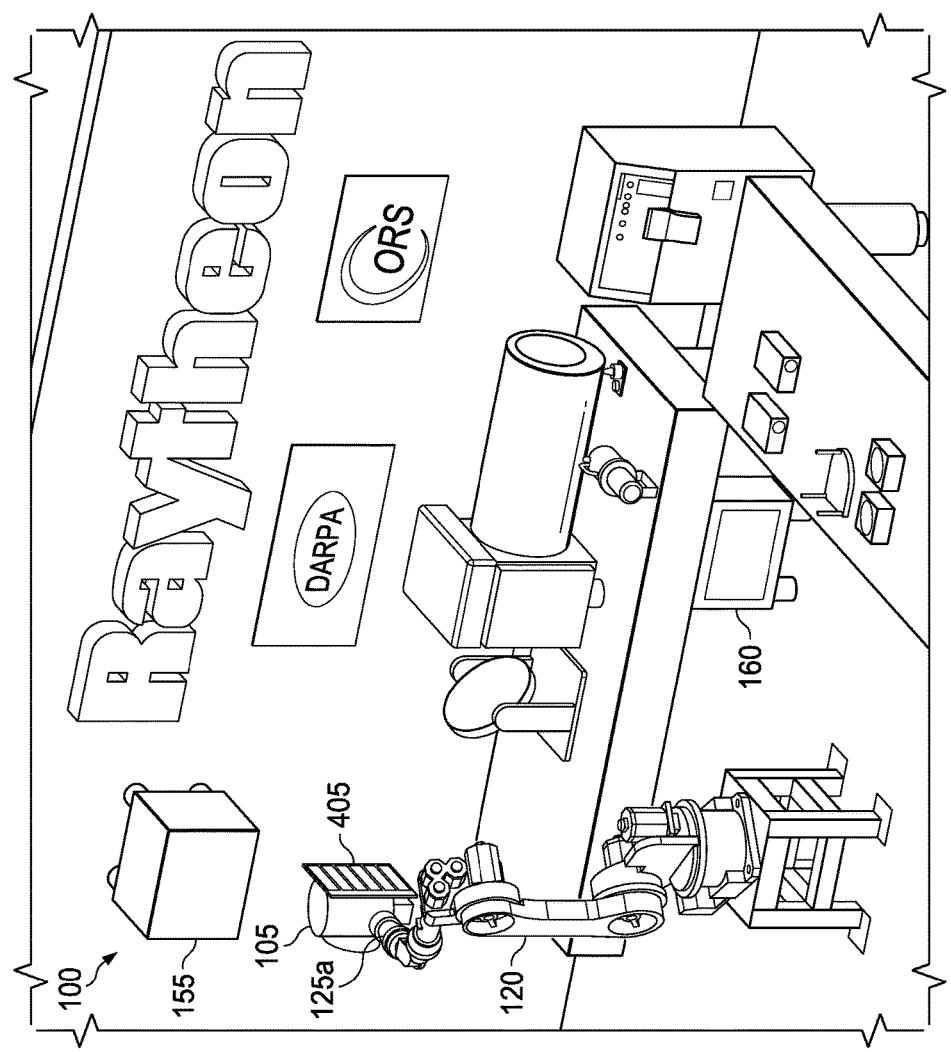

FIG. 5B illustrates the spacecraft testing system of FIG. 1 using the robot arm 120 to lift the spacecraft 105 toward a ceiling-mounted test station 155. The robot arm 120 lifts the spacecraft 105 to a height (for example, 6 feet 8 inches above the floor) above the reach of an average human. The robot arm 120 rotates the spacecraft 105 so that the solar panel 405 is oriented according to the positive x-axis.

Figure 5C:
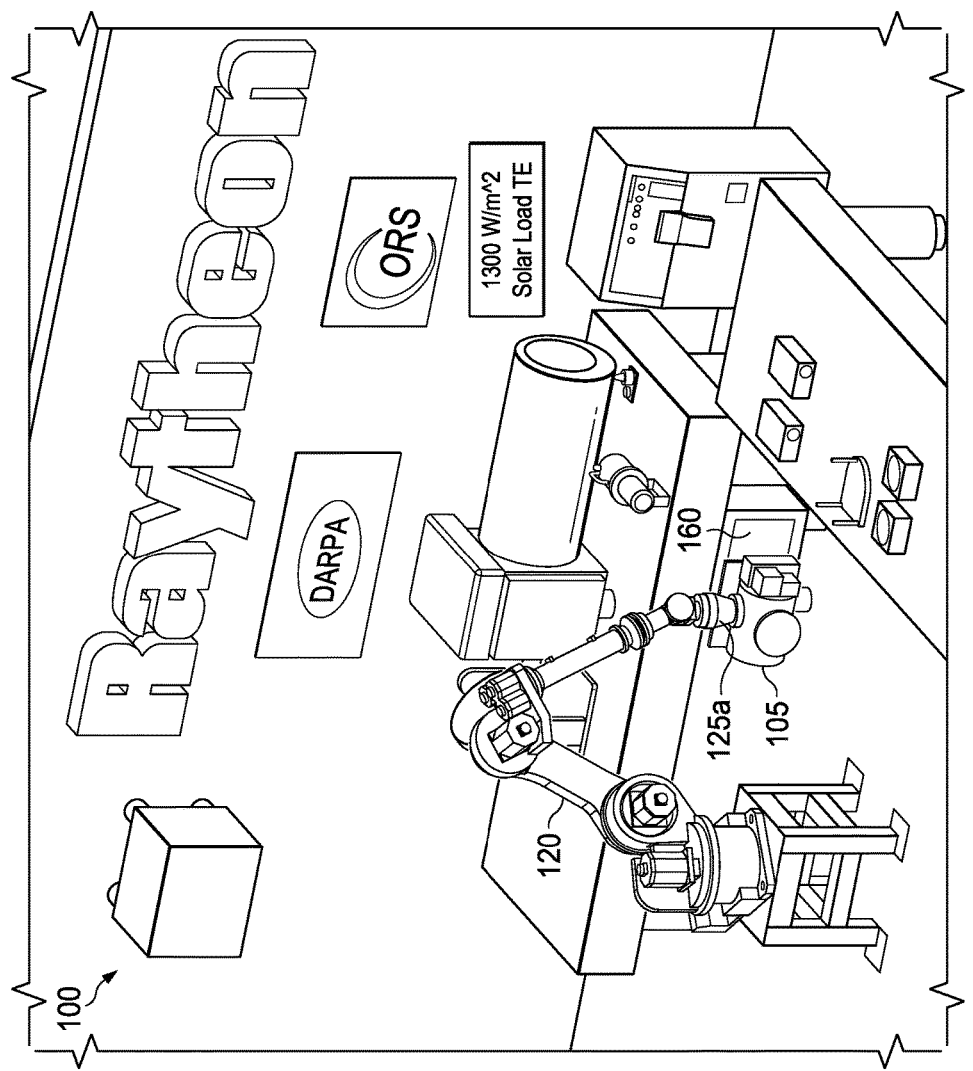

FIG. 5C illustrates the spacecraft testing system of FIG. 1 using the robot arm 120 to lower the spacecraft 105 toward a floor-level test station 160. The robot arm 120 lowers (in the direction of the negative y-axis) and rotates the spacecraft 105 so that the solar panel 405 is oriented according to the positive z-axis. The solar load test station 160 is ON (shown by the non-shaded rectangle within the housing of the solar load test equipment) and emitting radiance onto the solar panel 405.

Figure 5D:
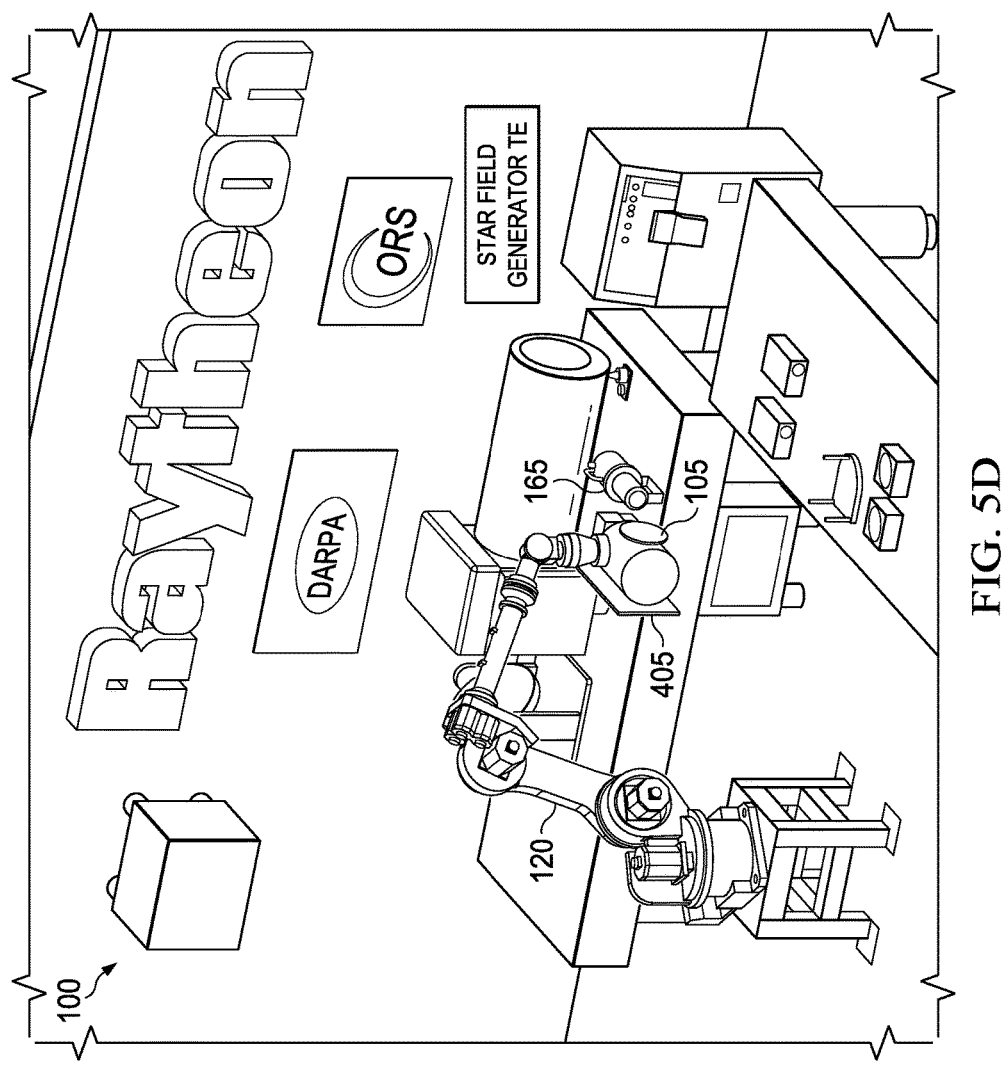

FIG. 5D illustrates the spacecraft testing system of FIG. 1 using the robot arm 120 to lift the spacecraft 105 to a bench-level star field generator test station 165. The robot arm 120 rotates the spacecraft 105 so that the solar panel 405 is oriented according to the negative x-axis, and so that the bottom of the spacecraft 105 faces the star field generator test equipment.

Figure 5E:
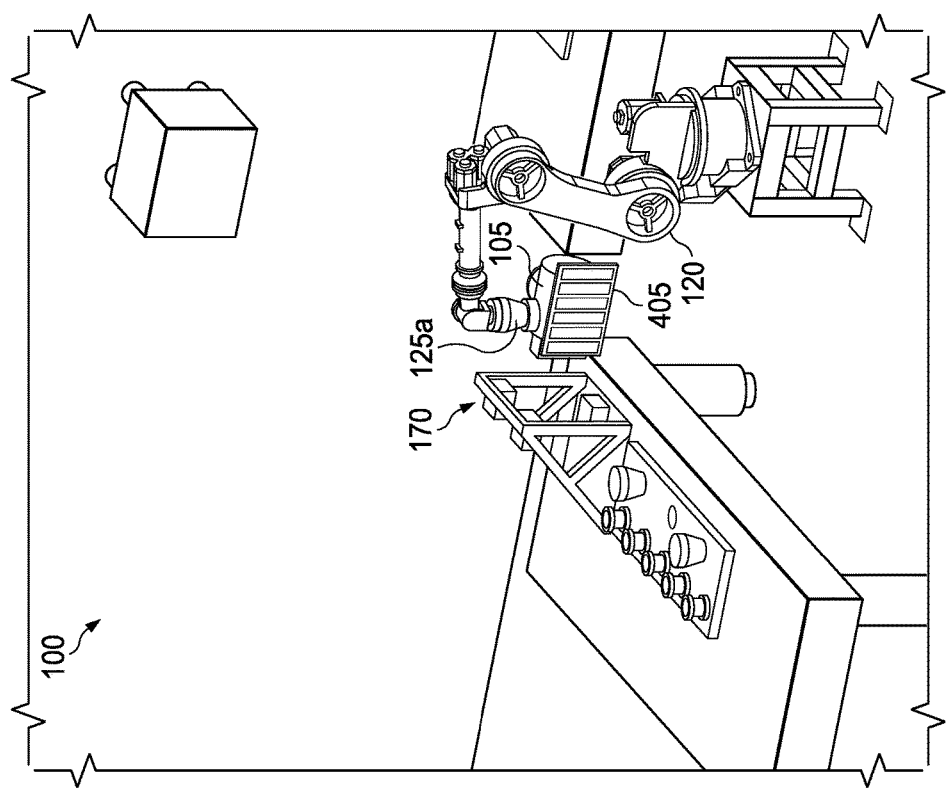

FIG. 5E illustrates the spacecraft testing system of FIG. 1 using the robot arm 120 to move the spacecraft 105 into multiple positions to conduct a series of tests at a bench-level wall of sources testing station 170. The robot arm 120 rotates, the spacecraft 105 so that the solar panel 405 is oriented according to the negative z-axis.

Figure 6A:
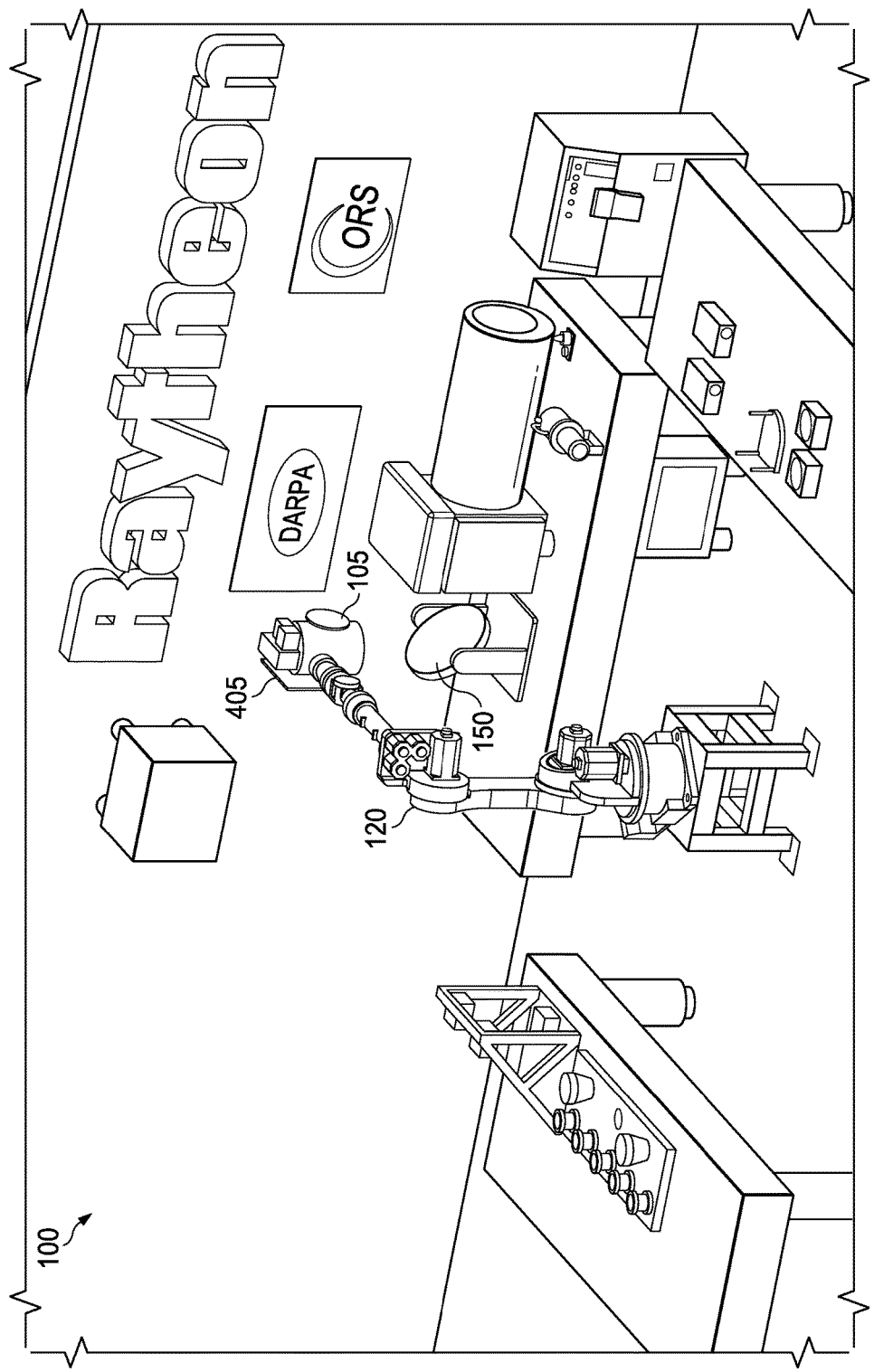
FIGS. 6A and 6B illustrates the spacecraft testing system of FIG. 1 conducting an a selected functionality test at a selected test station according to embodiments of the present disclosure.
Figure 6B:
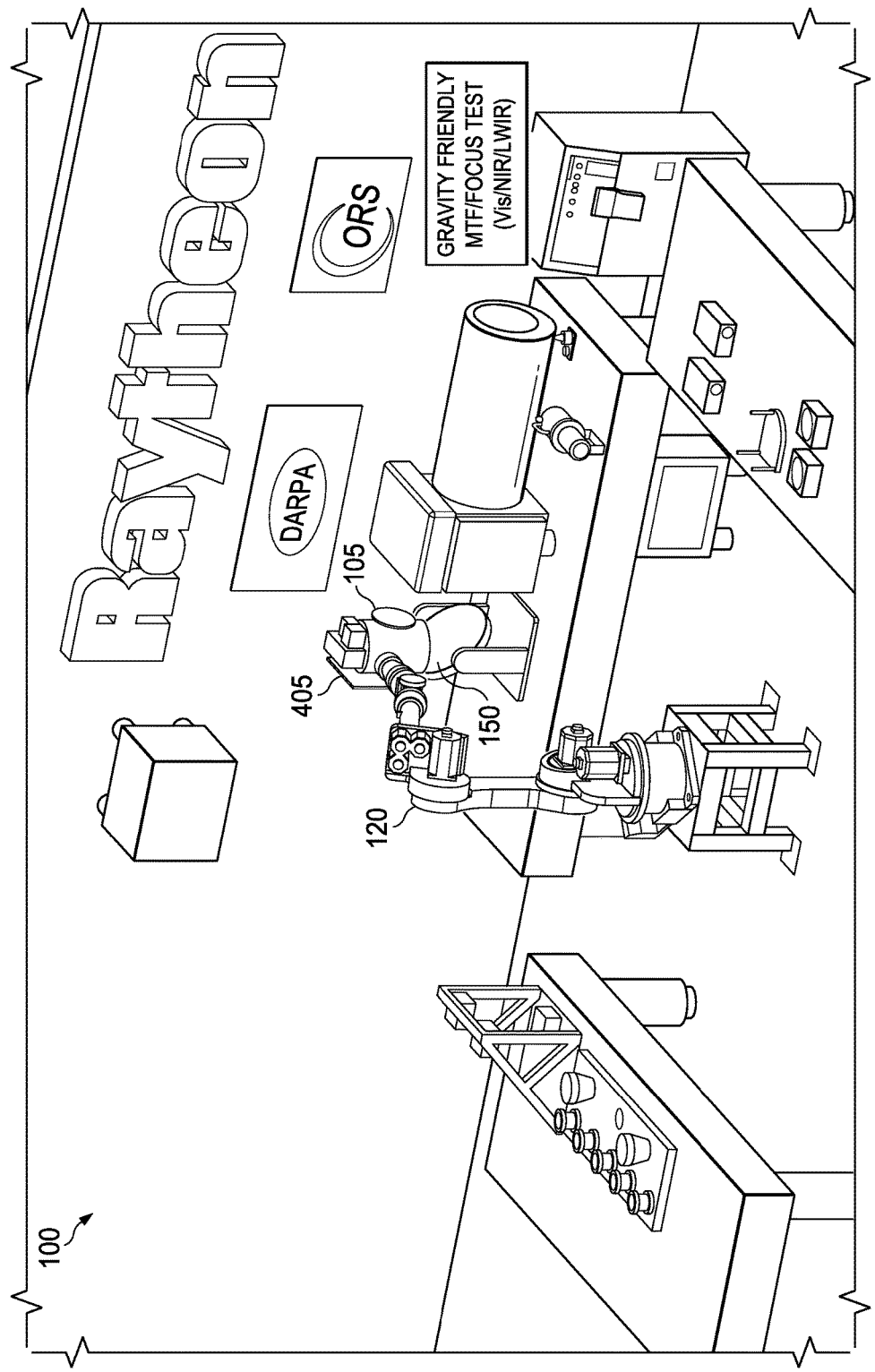

FIGS. 6A and 6B illustrate the spacecraft testing system of FIG. 1 conducting a selected functionality test at a selected test station, such as described in the process block 240, according to embodiments of the present disclosure. The implementation of the process block 240 shown in FIGS. 6A and 6B is for illustration only. Other embodiments could be used without departing from the scope of this disclosure.

In the example shown, the control unit 190 has selected to test the functionality of the earth imaging camera disposed at the top of the SeeMe spacecraft 105. That is, the control unit 190 has selected the optical test station 150. To conduct the optical imaging functionality test, the robot arm 120 rotates the spacecraft 105 so that the camera lens at the top of the spacecraft 105 faces vertically down, oriented according to the negative y-axis. Next, as shown in FIG. 6A, the robot arm 120 hovers the spacecraft 105 high above the test equipment at the optical test station 150. Next, as shown in FIG. 6B, the robot arm 120 lowers the spacecraft toward a bench-level optical testing station 150. During the optical imaging functionality test, the robot arm 120 positions the spacecraft 105 so that the optics in the camera point straight down to avoid distortions that gravity causes when the optics of the camera have any sideways movement (i.e., movement in the x-z plane). That is, sideways movement does not distort the images captured by the optics of the camera in the zero-gravity environment of space, but in the test area where the images captured by the camera's optics depend on Earth's gravity, the control unit 190 can identify and subtract out gravity dependencies or distortions.

Though the optical imaging functionality test does not require an ATT 130 to connect to the spacecraft 105, other functionality tests at other test stations can require that the spacecraft 105 connect to an ATT in addition to a PSM 125. Examples of other functionality tests at other test stations that require an ATT 130 are described more particularly below with reference to FIGS. 9A-9B, FIGS. 10A-10B, and FIGS. 11A-11B.

At a different test station in the room, the control unit 190 can control the robot arm 120 and the spacecraft 105 to execute different processes according to the functionality test to be conducted at the other test station. Other examples of executing a selected functionality test at a different test station in the spacecraft testing system 100 are described more particularly below with reference to FIGS. 9A-9B, FIGS. 10A-10B, and FIGS. 11A-11B.

Figure 7A:
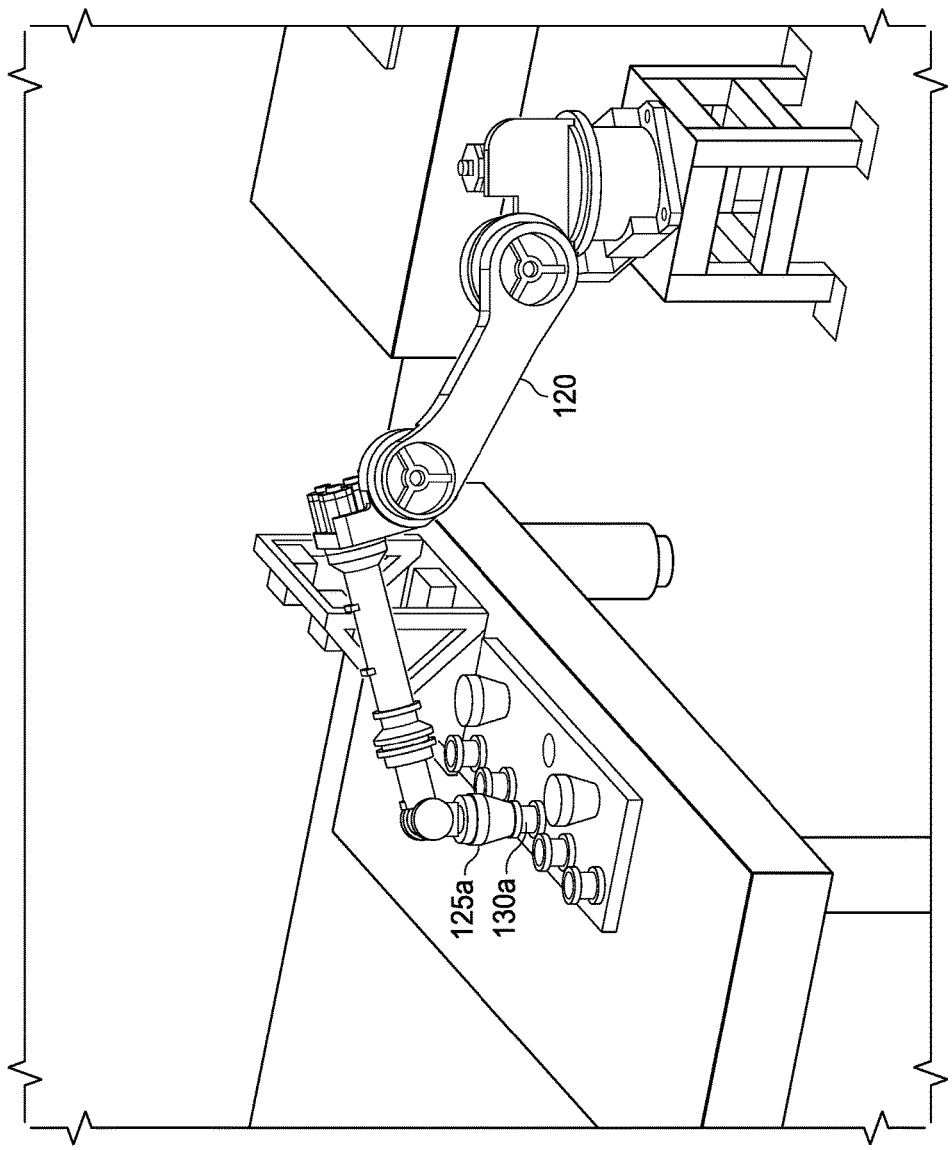
FIGS. 7A-7C illustrate the spacecraft testing system of FIG. 1 using the robot arm to selectively couple a selected PSM to a selected ATT according to embodiments of the present disclosure.
Figure 7B:
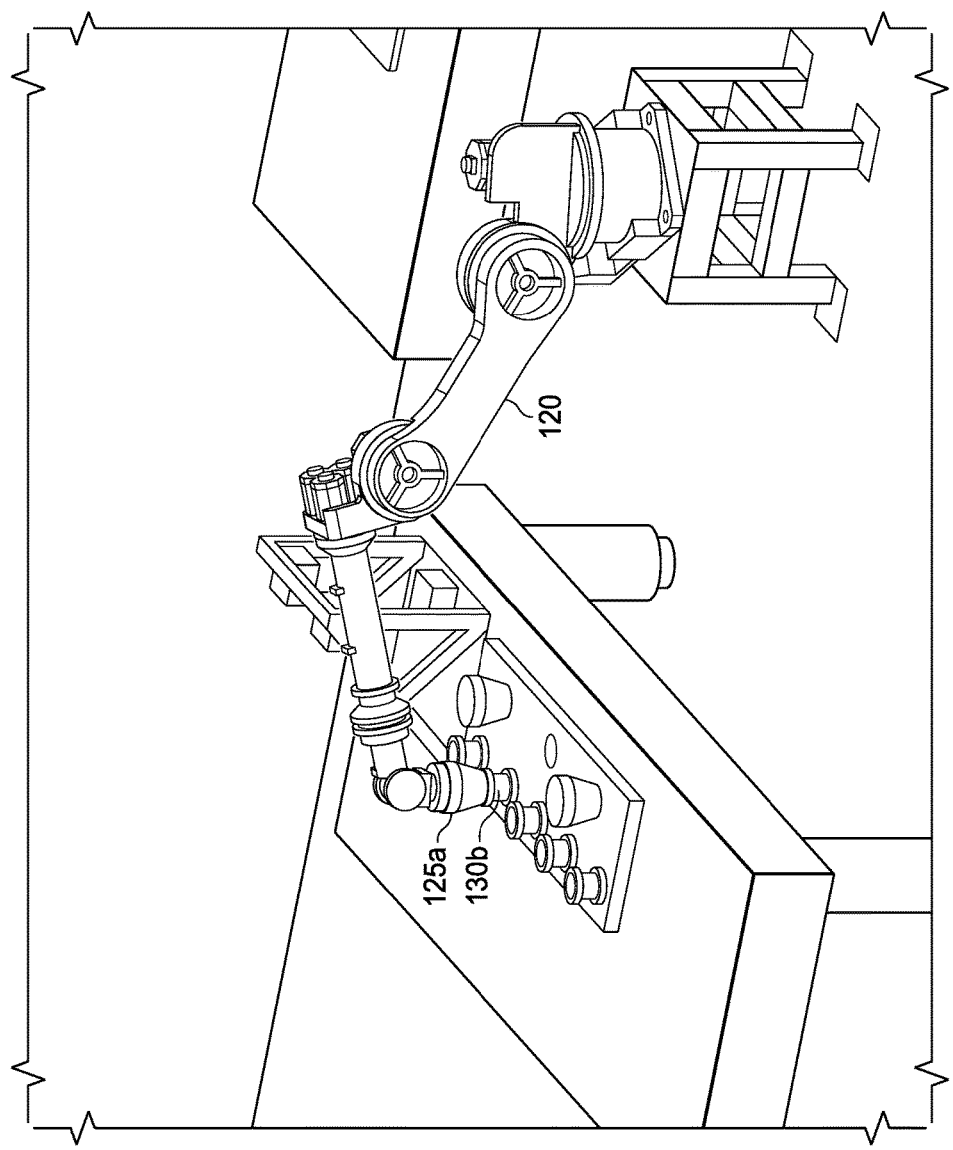
Figure 7C:
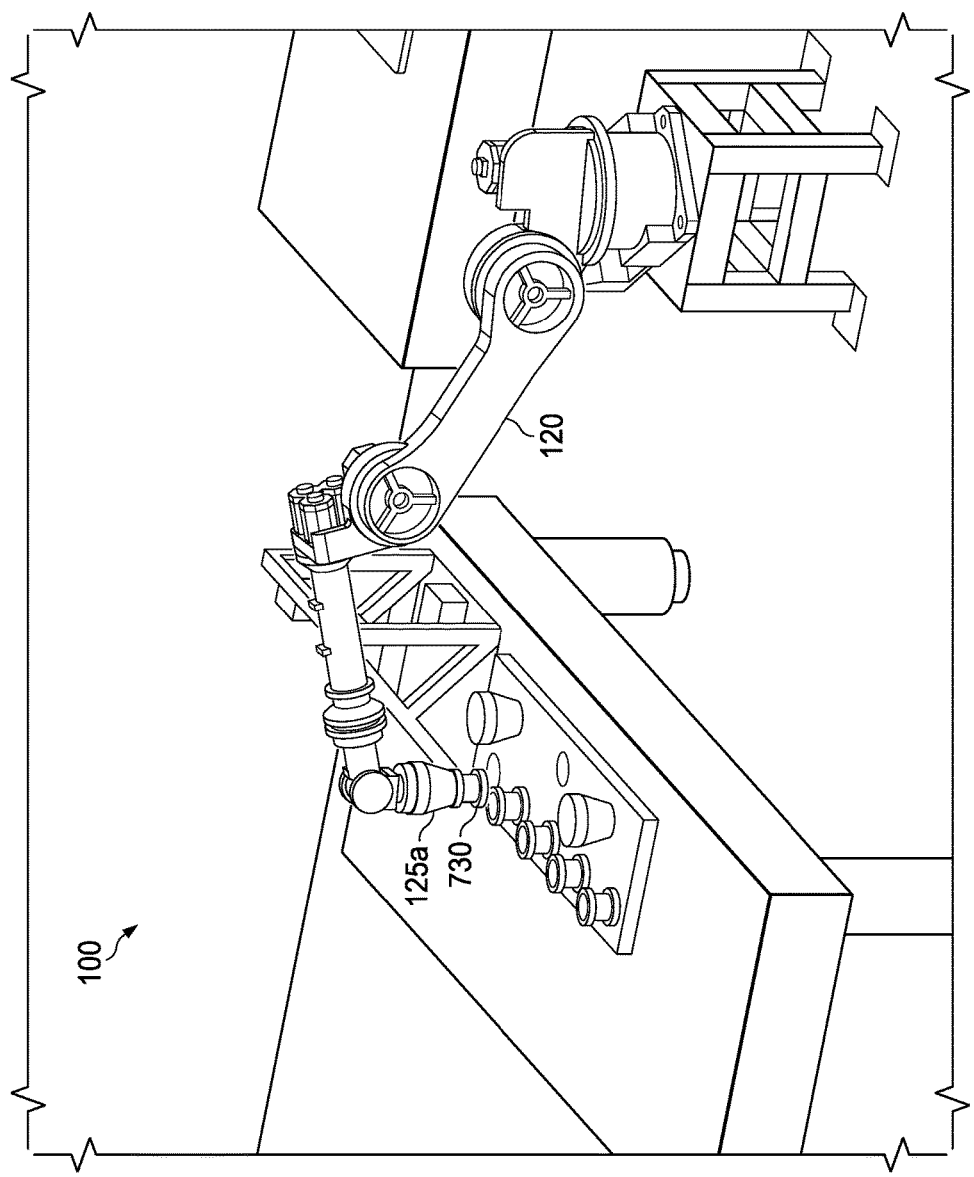

FIGS. 7A-7C illustrate the spacecraft testing system of FIG. 1 using the robot arm 120 to selectively couple a selected PSM to a selected ATT, such as described in the process block 225, according to embodiments of the present disclosure. As shown, the robot arm 120, connected to the first PSM 125a, selectively couples to an ATT 130 selected by the control unit 190. The implementation of the process block 225 shown in FIGS. 7A-7C is for illustration only. Other embodiments could be used without departing from the scope of this disclosure.

In FIG. 7A, the control unit 190 has selected to couple the first PSM 125a to a first ATT 130a. The first ATT 130a includes an inertial measurement device (IMU) configured to measure rate, acceleration, and angular roll direction of a motion. More particularly, the first ATT 130a includes a reference high-quality IMU calibrated to a high accuracy. In FIG. 7B, the control unit 190 has selected a second ATT 130b. In FIG. 7C, the control unit 190 has selected a third ATT 730, which can be a Reaction Wheel tool.

Figure 8:
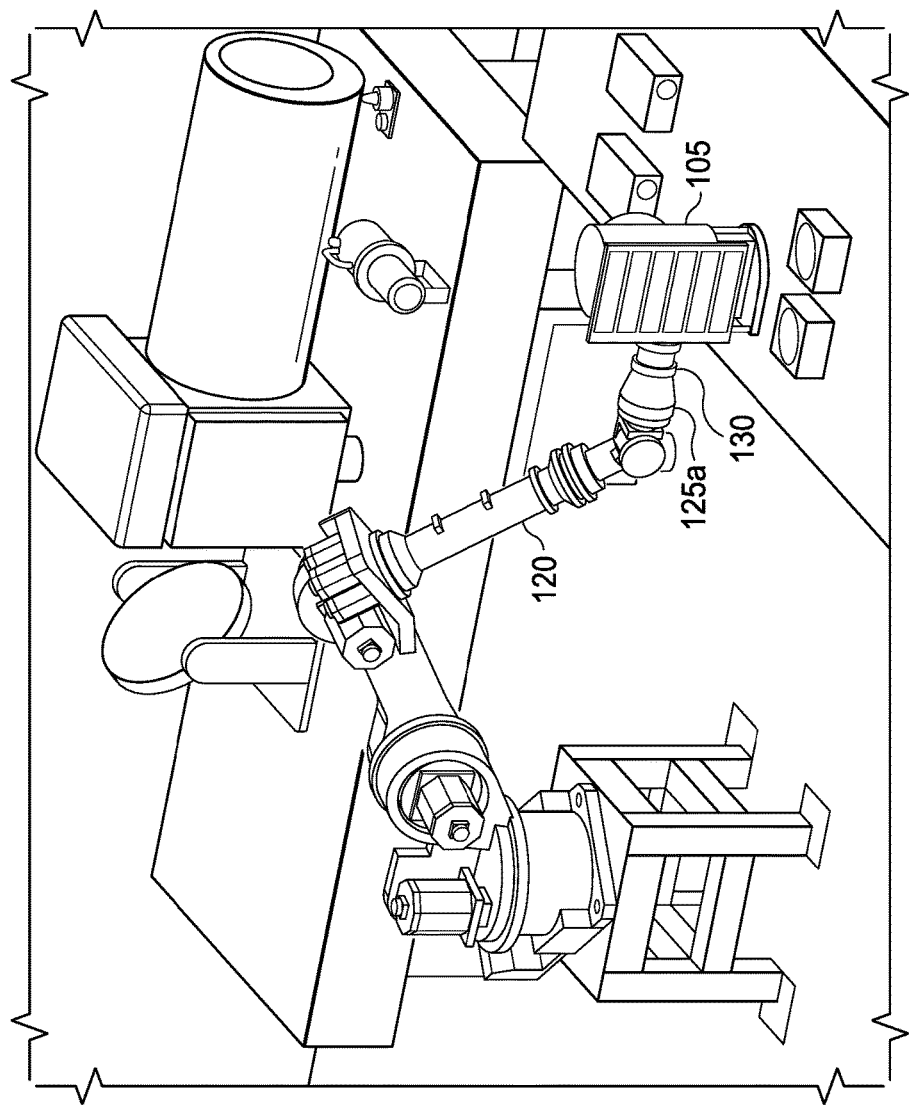
FIG. 8 illustrates the spacecraft testing system of FIG. 1 using a robot arm, a selected PSM, and a selected ATT to couple a spacecraft according to embodiments of the present disclosure.

FIG. 8 illustrates the spacecraft testing system of FIG. 1 using a robot arm, a selected PSM, and a selected ATT to couple a spacecraft according to embodiments of the present disclosure. The implementation of the process block 230 shown in FIG. 8 is for illustration only. Other embodiments could be used without departing from the scope of this disclosure. As shown, the robot arm 120 is directly coupled to the first PSM 125a, which is directly coupled between the selected ATT 130 and the robot arm 120. The robot arm 120 drives the ATT 130 horizontally to press against the test interface of the spacecraft 105. By pressing the second interface of the ATT 130 against the test interface of the spacecraft 105, the second interface of the ATT 130 electrically and mechanically couples to the test interface of the spacecraft 105. That is, the spacecraft 105 receives electrical energy through the robot arm 120, PSM 125a, and ATT 130.

Figure 9B:
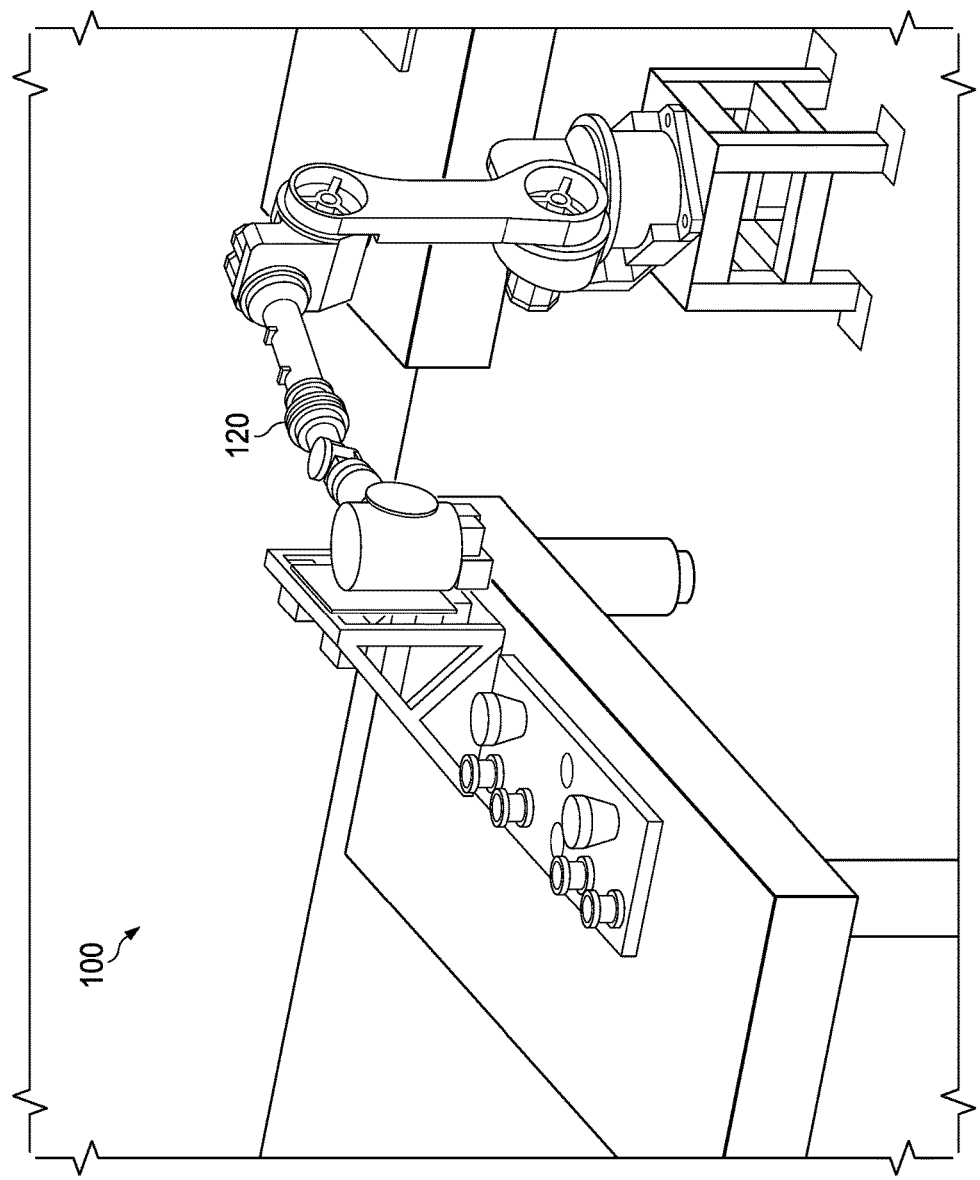

FIGS. 9A and 9B illustrate the spacecraft testing system of FIG. 1 using the robot arm 120 to traverse the spacecraft through a sequence of spatial positions to conduct a 6 DOF motion functionality test according to embodiments of the present disclosure. The spacecraft testing system 100 conducts the 6 DOF motion functionality test at the 6 DOF motion test station 175. The control unit selects the first ATT 130a, which is configured to conduct the 6 DOF motion functionality test.

Figure 10B:
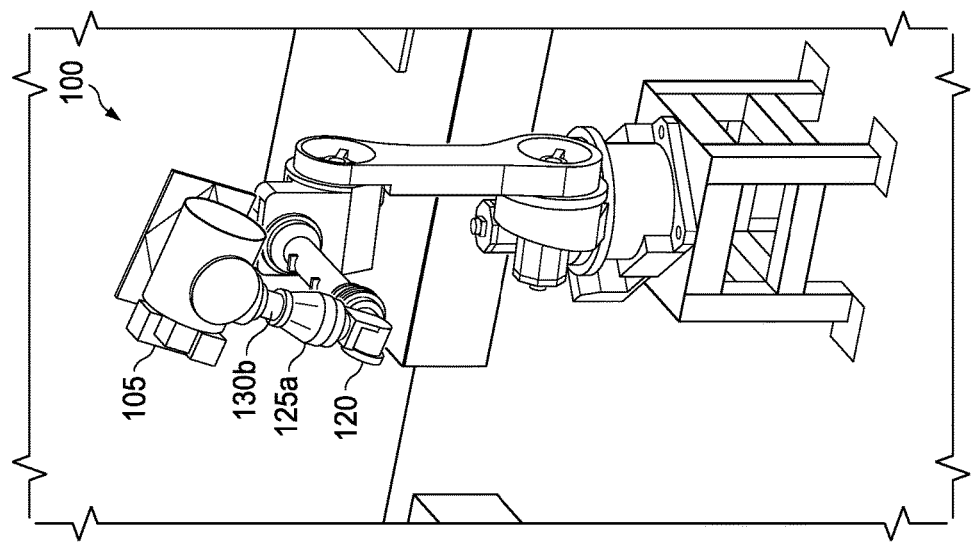
Figure 10A:
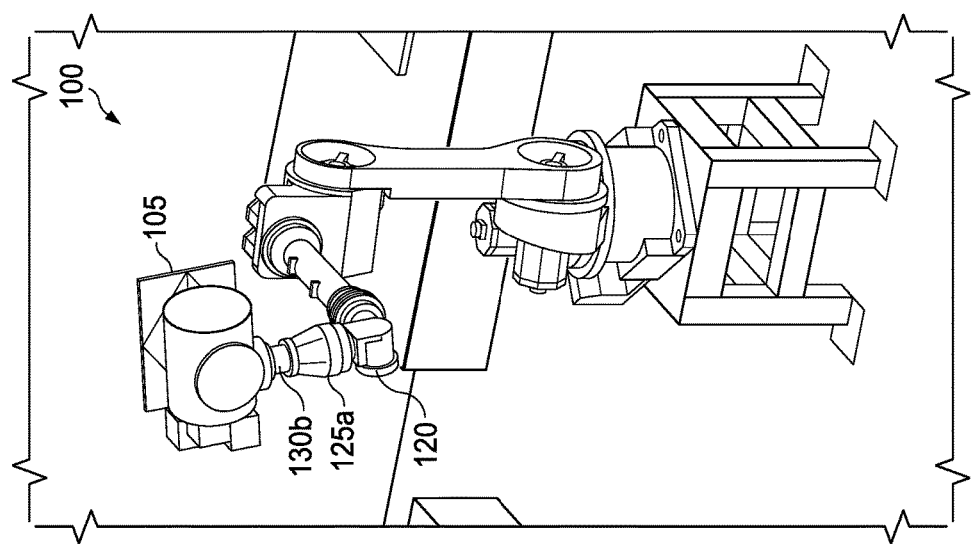

FIGS. 10A and 10B illustrate the spacecraft testing system of FIG. 1 using the robot arm 120 to traverse the spacecraft through a sequence of spatial positions to conduct a Run weight/CG 3 axes functionality test according to embodiments of the present disclosure. The spacecraft testing system 100 conducts the Run weight/CG 3 axes functionality test at the Run weight/CG 3 axes test station 180. The control unit selects the second ATT 130b, which is configured to conduct the Run weight/CG 3 axes functionality test.

Figure 11A:
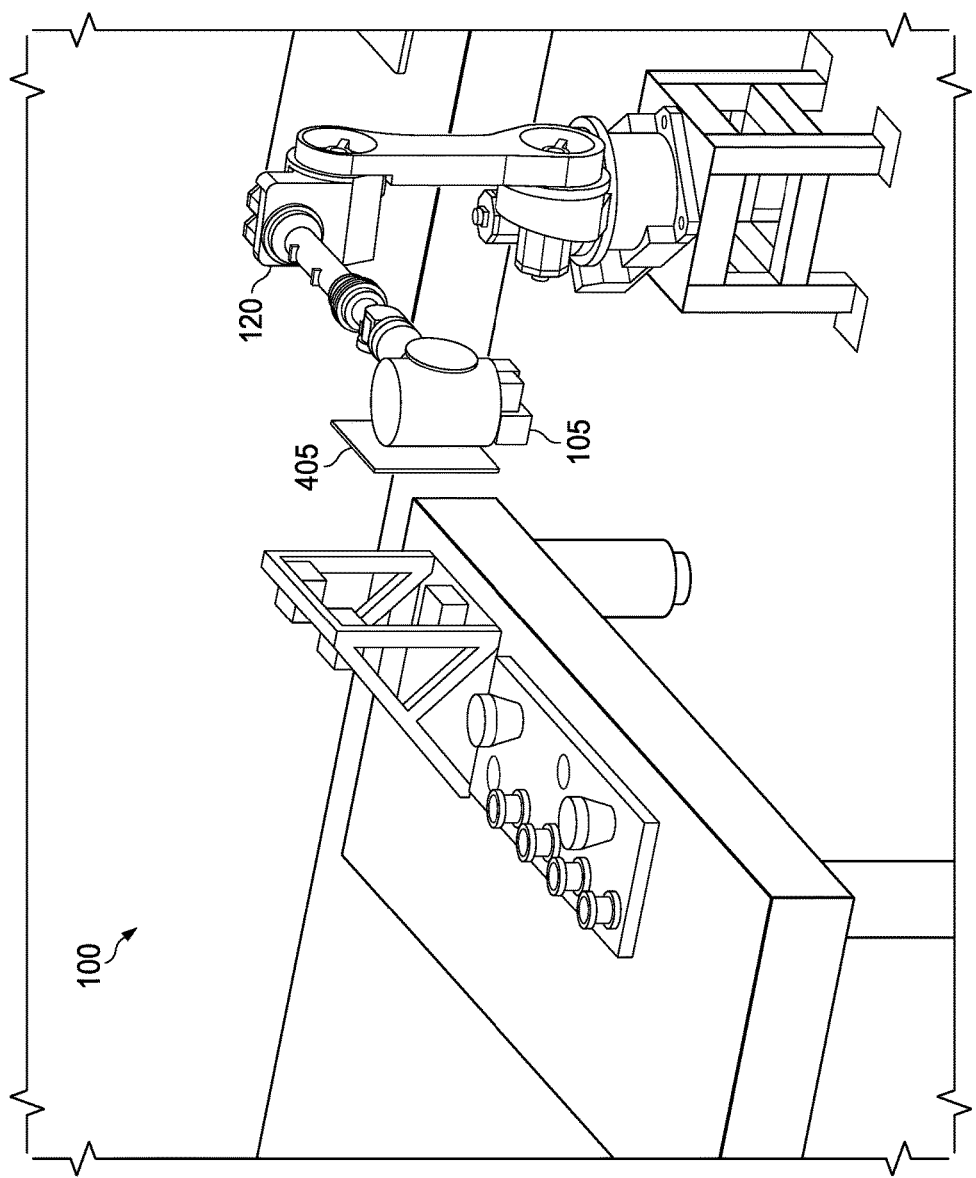
Figure 11B:
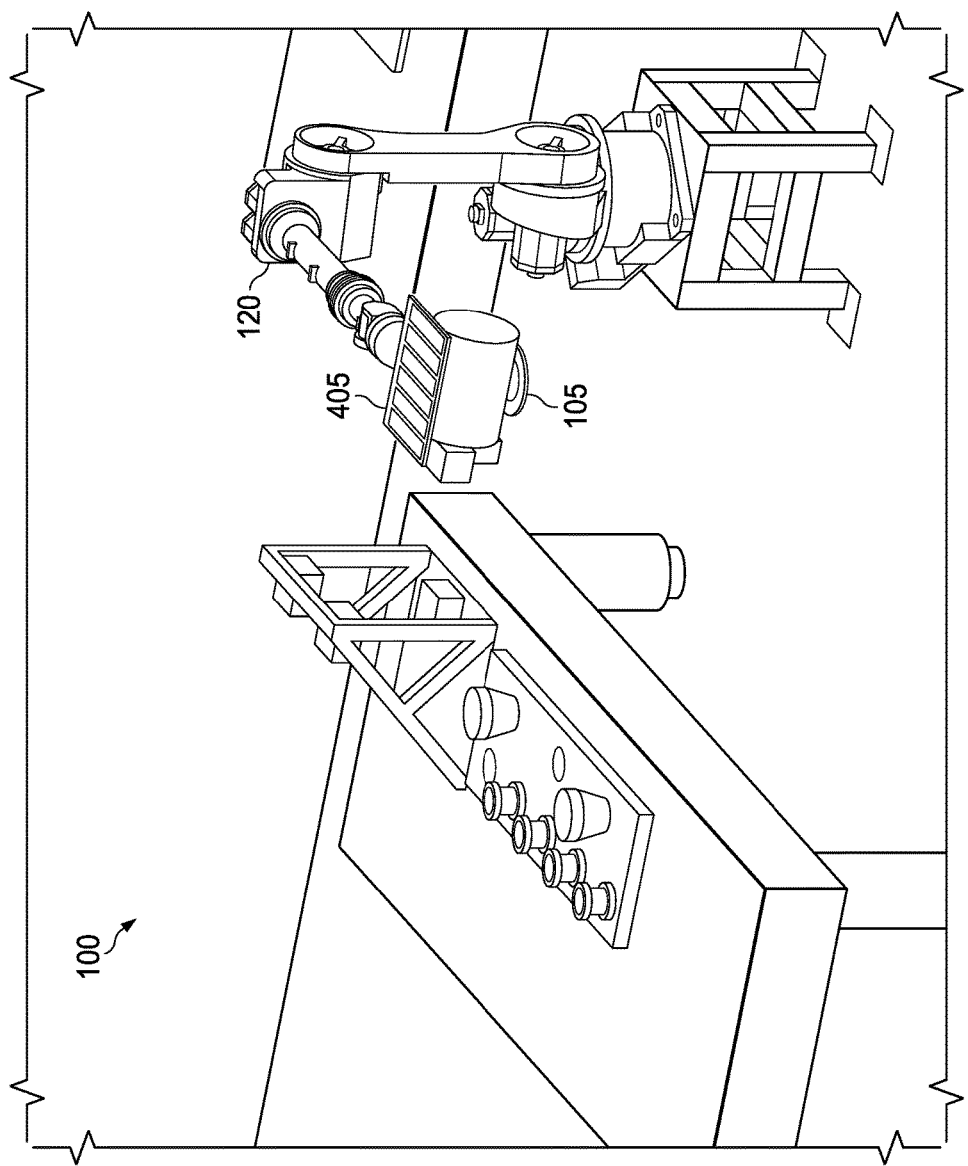

FIGS. 11A and 11B illustrate the spacecraft testing system of FIG. 1 using the robot arm 120 to traverse the spacecraft through a sequence of spatial positions to conduct a run torque measure of RW in 3 axes functionality test according to embodiments of the present disclosure. The implementation of conducting a run torque measure of RW in 3 axes functionality test shown in FIGS. 11A-11B is for illustration only. Other embodiments could be used without departing from the scope of this disclosure.

The spacecraft testing system 100 conducts the run torque measure of RW in 3 axes functionality test at the run torque measure of RW in 3 axes test station 185. The functionality test assesses how well the reaction wheels 108 perform. The operation of the set of reaction wheels 108 is described more particularly below, in reference to FIG. 15A-15B. The control unit selects the third ATT 730, which is configured to conduct the run torque measure of RW in 3 axes functionality test. The third ATT 730 includes a Reaction Wheel tool, which is a torque sensor or torque plate. For each of the six axes, the torque sensor can sense the amount of torque applied to the third ATT 730. For example, when the robot arm 120 uses the third ATT 730 to couple to the spacecraft 105, the weight of the spacecraft 105 (caused by Earth's gravity) applies a torque to the torque sensor of the third ATT 730. The third ATT 730 senses and measures the amount of the gravity induced torque.

During the run torque measure of RW in 3 axes functionality test, the robot arm 120 positions the spacecraft 105 to align with three different axes. The spacecraft 105 includes a reaction wheel for each of the three axes (x, y, and z). In each of the three positions, the torque sensor of the third ATT 730 provides measurements to the control unit 190 for the two reaction wheels that are not aligned with the force of gravity because gravity affects the torque measurements. More particularly, FIG. 11A shows that the robot arm 120 positions the spacecraft 105 to align with the vertical y-axis, which is affected by gravity. In certain embodiments, the control unit 190 receives measurements according to all of the reaction wheels (including the gravity affected reaction wheel). The third ATT 730 can also measure test results of torque for the entire spin speed range of the reaction wheels. In FIG. 11A, the torque sensor of the third ATT 730 provides measurements to the control unit 190 for the x-axis and z-axis reaction wheels. FIG. 11B shows that the robot arm 120 positions the spacecraft 105 to align with the horizontal x-axis. FIG. 5A shows that the robot arm 120 positions the spacecraft 105 to align with the depth z-axis.

FIG. 12 illustrates a table 1200 for an 18-position IMU characterization test. The 18-position IMU characterization test is a serial and semi-static method of collecting a set of data (i.e., $\{\varphi, \theta, a_x, a_y, a_z, \omega_x, \omega_y, \omega_z\}$) for each position of the 18 positions (also referred to as a degree of freedom). A machine aligned with true north rotates the UUT (such as the spacecraft 105) to a first position and collects a set of data, then rotates the UUT to a second position (e.g., 45° displaced from the first position) and collects another set of data. Measurements from each of the 18 positions correspond to one axis from the 3-axes coordinates 300. Measurements for each of the axes in the 3-axes coordinates 300 are repeated six times using different angular dispositions (e.g., incremented by 45°), which are used to decouple certain information. The table 1200 enables a precise understanding of the acceleration and rotation vectors of the IMU of the UUT.

According to embodiments of the present disclosure, the spacecraft testing system 100 implements a dynamic IMU characterization test. During the dynamic IMU characterization test, the robot arm 120 (coupled to a PSM and ATT) traverses a UUT, such as the spacecraft 105 through a series of the six semi-random movements selected by the control unit 190. The end effector includes an IMU as the reference IMU for the dynamic IMU characterization test. That is, as the robot arm 120 traverses the spacecraft 105 UUT through the series of the six semi-random movements, the control unit 190 simultaneously collects data from the on-board IMU of the spacecraft and from the reference IMU. The data collected while the robot arm 120 traverses the spacecraft 105 UUT through the series of the six semi-random movements can fully populate the table 1200. The control unit 190 uses the data collected from the reference IMU as a reference for comparing the data of the IMU of the UUT. That is, the control unit 190 can use the data collected from the reference IMU as a standard for correct information, and use deviations of the data of the IMU of the UUT from the standard as an indicator of accuracy of the data of the IMU of the UUT. The data collected from the reference IMU can be used by the control unit 190 to decouple certain information.

The control unit 190 selects the six semi-random movements to represent the 18-positions listed in the table 1600. In the table 1200, the six rectangles that have a bold perimeter represent an example of six semi-random movements that the control unit 190 can select to conduct a dynamic IMU characterization test. Each of the selected six semi-random movements excite the IMU to measure a set of data (i.e., $\{\varphi, \theta, a_x, a_y, a_z, \omega_x, \omega_y, \omega_z\}$) representing gravity vectors for a subset of the 18-positions listed in the table 1200. The subset can include one or multiple positions from the 18-positions listed in the table 1200. As a technical advantage, the dynamic IMU characterization test compounds the 18 stop-and-go iterations of collecting data into a continuous collection of data from six uninterrupted motions, which reduces testing steps and time. The dynamic IMU characterization test increases the automation and repeatability of the test by removing manual labor used to iteratively rotate and place the UUT in the true-north oriented machine discussed above.

FIGS. 14A-14H illustrate modular examples of spacecraft testing system of FIG. 1 according to embodiments of the present disclosure. The modular examples shown in FIGS. 14A-14H are for illustration only. Other embodiments could be used without departing from the scope of the present disclosure. As shown, each end effector 121, 1426-1427, 1431-1432, 1405-1407 includes multiple mechanical nubs to which air is applied to force the nubs to protrude into receiving holes of another end effector to which to mate, thereby mechanically locking the end effector in place. That is, the supply of air pressure is used to establish a mating connection of end effectors to each other, and reversal of the direction of air pressure can be used to release the connection. An inner metallic portion of the end effector includes multiple mechanical nubs that protrude into receiving holes of the inner metallic portion of the end effector to which to mate, thereby mating two end effectors. When two end effectors mate, the two end effectors electrically and mechanically connect based on one motion of the robot arm 120, and the device to which the two end effectors respectively belong connect to each other electrically, mechanically, and communicably.

Figure 14A:
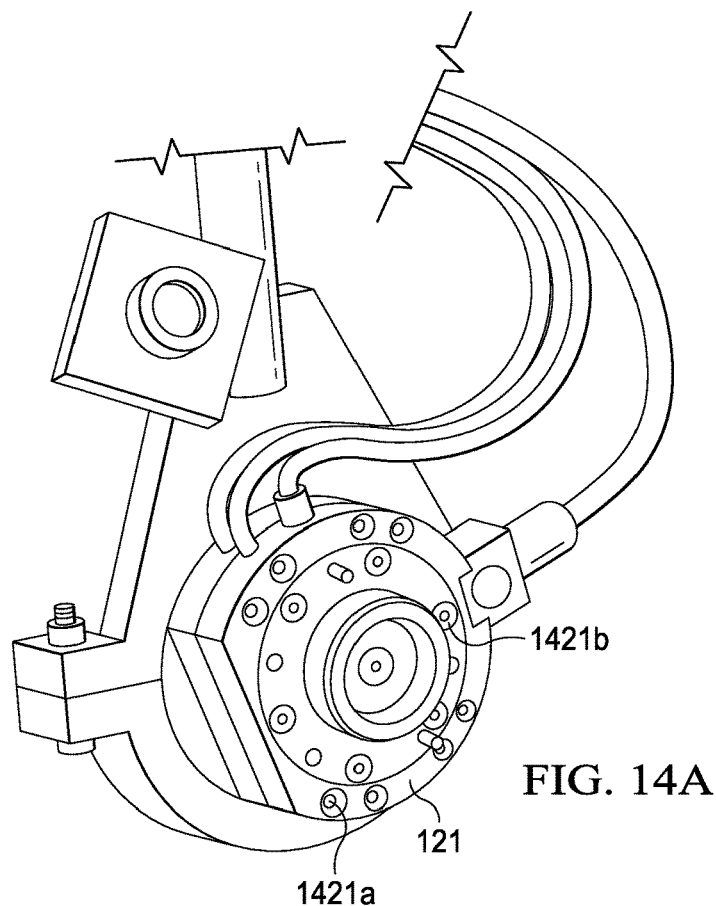
FIGS. 14A-14H illustrate modular examples of spacecraft testing system of FIG. 1 according to embodiments of the present disclosure.

FIG. 14A shows a portion of the robot arm 120 including the end effector 121. In the example shown, the end effector 121 is a male type interface, yet other types of interfaces can be used without departing from the scope of this disclosure. The end effector 121 includes multiple mechanical nubs 1421a that protrude into receiving holes 1422a, thereby mechanically locking the end effector 121 in place relative to the end effector 1426. An inner metallic portion of the end effector 121 includes multiple mechanical nubs 1421b that protrude into receiving holes 1422b, thereby mating two end effectors 121 and 1426. Mating the two end effectors 121 and 1426 causes the robot arm 120 to electrically, mechanically, and communicably connect to the PSM 125. The arrow indicates that the end effector 121 is configured to couple to the first interface 1426 of any PSM 125.

Figure 14B:
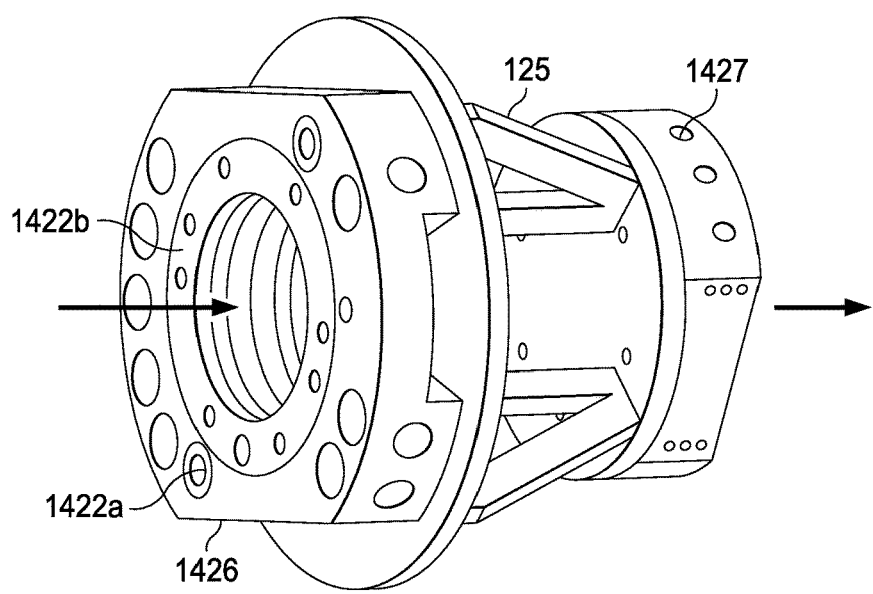

FIG. 14B shows a PSM 125. The PSM 125 includes a first interface 1426 configured to electrically and mechanically couple to the end effector 121 of the robot arm 120. In the example shown, the first interface 1426 includes an end effector having a female type interface, yet other types of interfaces can be used without departing from the scope of this disclosure. The PSM 125 includes a second interface 1427 configured to electrically and mechanically couple directly to the test interface 1405-1407 of any UUT 105-107. The second interface 1427 includes an end effector that is additionally configured to directly couple to the first interface 1431 of any ATT 130. The arrow indicates that the end effector 1427 is configured to couple to the first interface 1431 of any ATT 130.

Figure 14C:
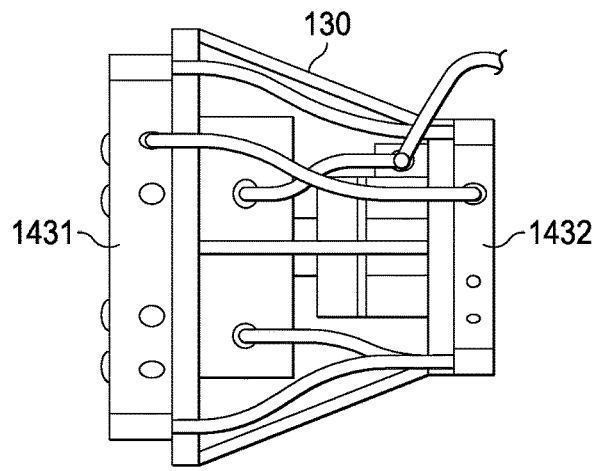
Figure 14D:
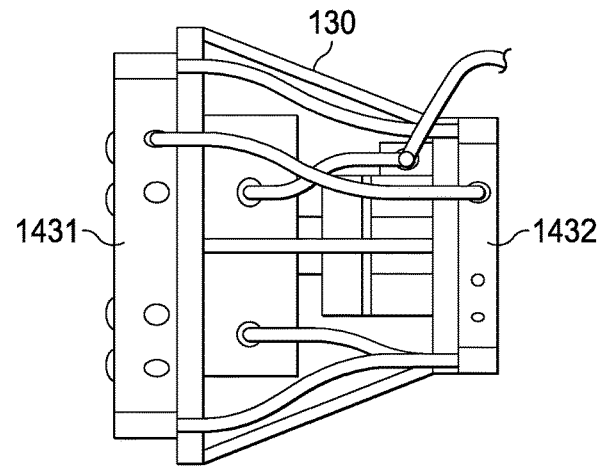
Figure 14E:
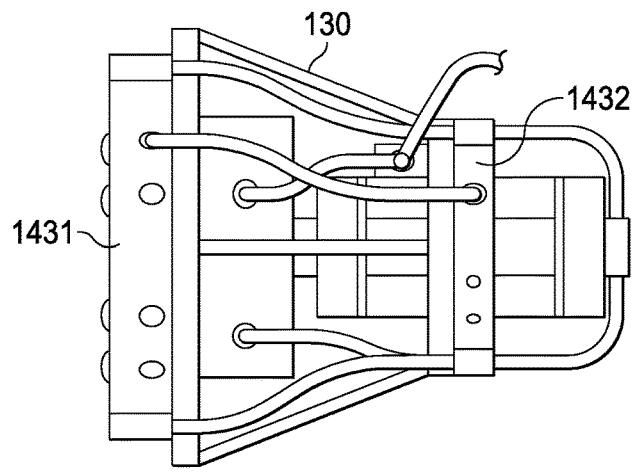

Each of FIGS. 14C-14E show an ATT 130 configured to test a specific functionality. Each ATT 130 includes a first interface 1431 configured to electrically and mechanically couple to the end effector 1427 of the second interface of the PSM 125. Each ATT 130 includes a second interface 1432 configured to directly couple to the test interface 1405, 1406, 1407 of any UUT 105-107. The ATTs 130 in FIGS. 14C-14D are reaction wheel tools, similar to the third ATT 730. In FIG. 14C, the ATT 130 includes a fine resolution six-axis reaction wheel torque plate suitable for testing functionality of a small reaction wheel (e.g., the size of a human hand). The fine resolution six-axis reaction wheel torque plate is not well suited for testing functionality of a large reaction wheel (e.g., approximately 2-3 times larger than the human hand size small reaction wheel) because the large reaction wheel generates substantially more torque than the small reaction wheel. The substantially greater torque can saturate the system of the fine resolution torque plate or cause the fine resolution torque plate to generate a substantially lower resolution of data compared to the resolution of measured data corresponding to the small reaction wheel. The ATT 130 in FIG. 14D includes a coarse resolution reaction wheel torque plate suitable for testing functionality of the large reaction wheel. Other embodiments of a reaction wheel tool can include a six-axis torque plate having a different resolution (fine, medium, or high) and a different torque sensing capability. The ATT 130 in FIG. 14E is similar to the first ATT 130a and tests an IMU.

Figure 14F:
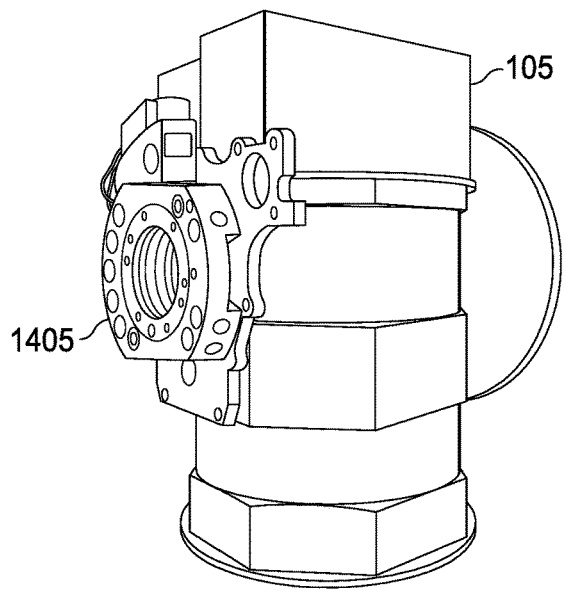
Figure 14G:
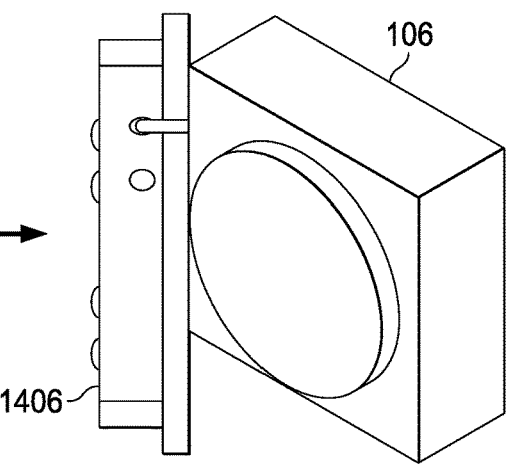
Figure 14H:
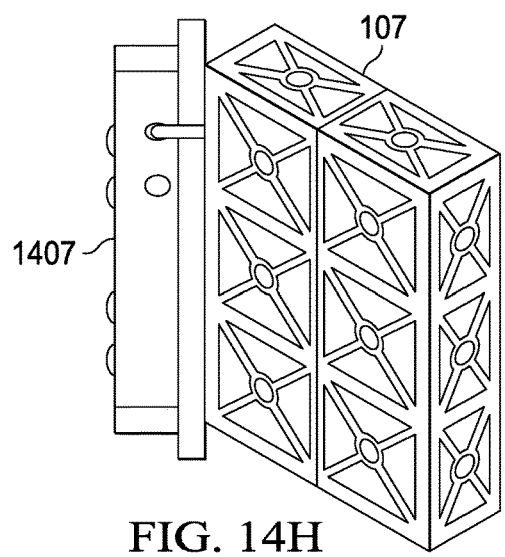

FIGS. 14F, 14G, and 14H show various UUTs, such as a SeeMe spacecraft 105, a Phoenix HiSAT 106, and an ORS 6U 107, respectively. The test interface of each UUT 105-104 includes an end effector 1405-1407 configured to mate with the PSMs 130 end effector 1427 and the end effector 1432 of any ATT 130.

Figure 15A:
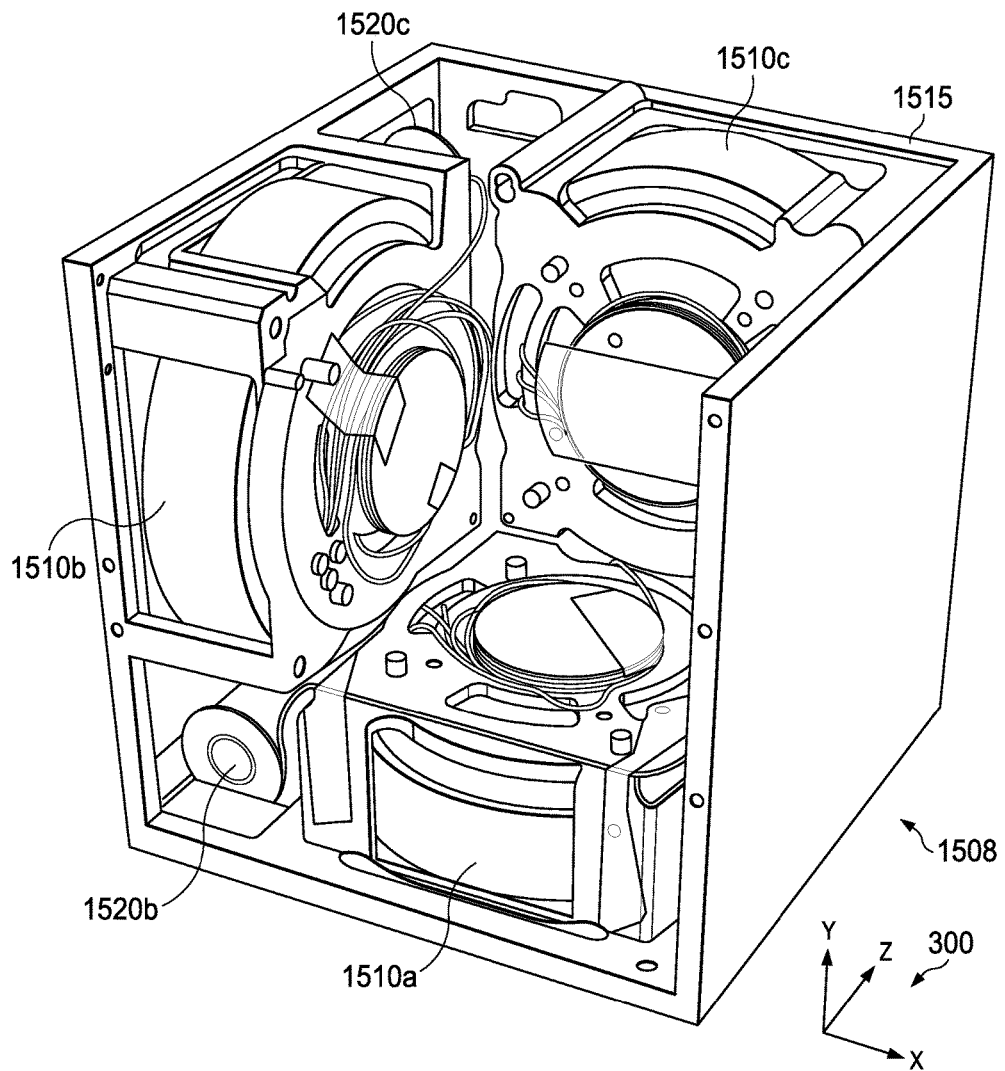
FIGS. 15A-15C illustrates a set of reaction wheels and a corresponding set of torque rods arranged in a housing according to embodiments of the present disclosure.
Figure 15B:
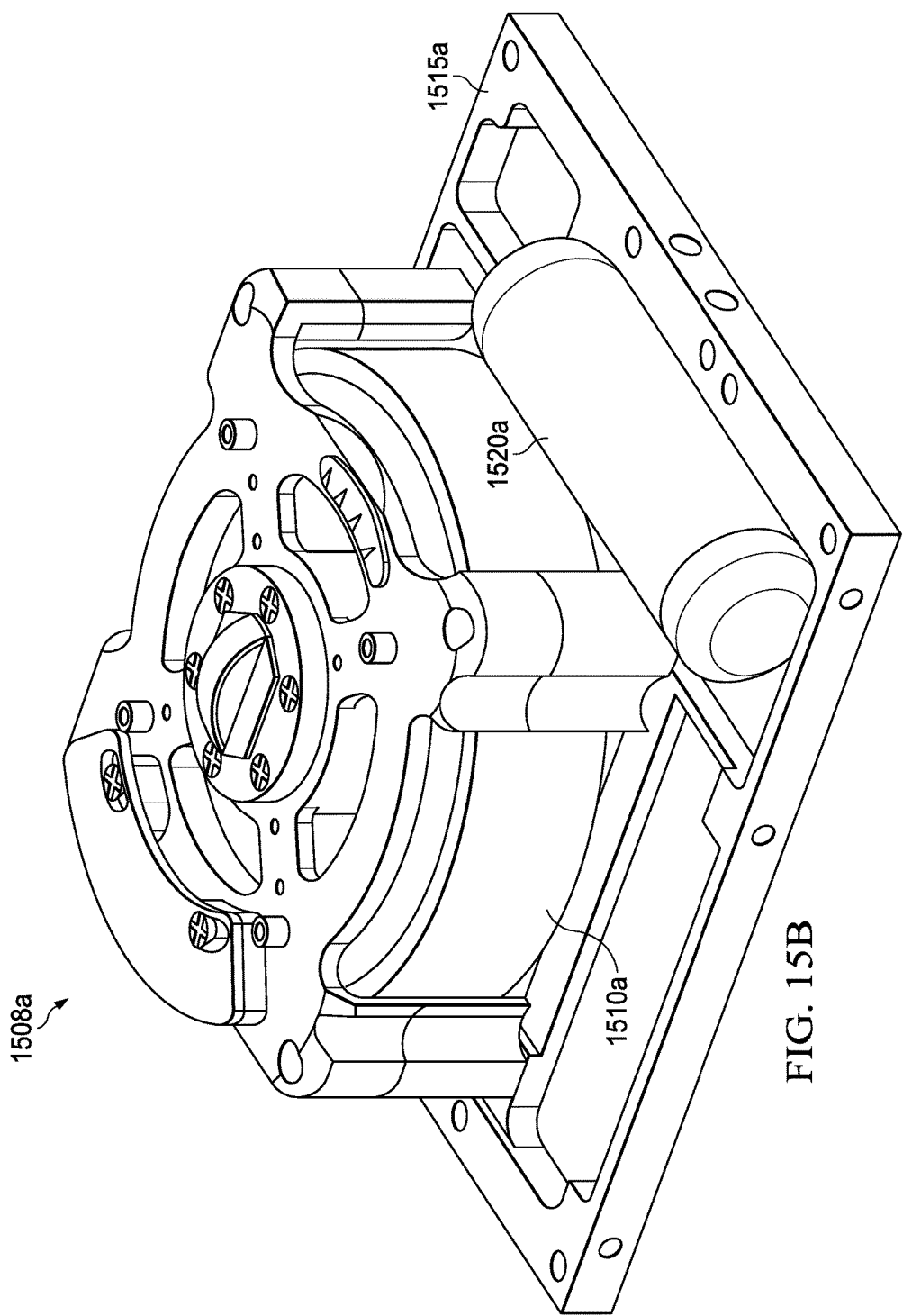
Figure 15C:
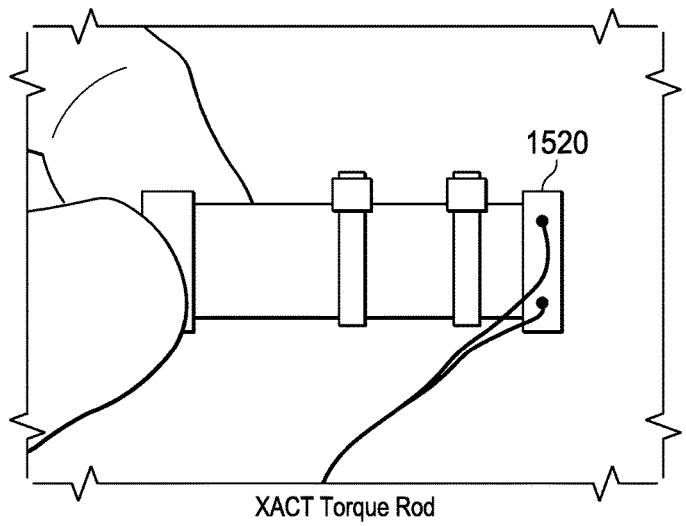

FIGS. 15A-15C illustrates a set of reaction wheels and a corresponding set of torque rods arranged in a housing according to embodiments of the present disclosure. The embodiments shown in FIGS. 15A-15C are for illustration only. Other embodiments could be used without departing from the scope of the present disclosure.

FIG. 15A shows a set of reaction wheels 1508 for a spacecraft, such as the spacecraft 105. The set of reaction wheels 1508 can be similar to the set of reaction wheels 108 described above. Each reaction wheel 1510a-1510c in the set of reaction wheels 1508 is housed within a housing 1515. The set 1508 includes an x-axis reaction wheel 1510a for applying a torque to the spacecraft in the horizontal plane, generating a rotation in the horizontal plane. The set 1508 includes y-axis 1510c and z-axis 1510b reaction wheels that operate similar to the x-axis reaction wheel 1510a to generate a rotation in the vertical and depth planes, respectively. In orbit, the set reaction wheels 1508 spin to rotate the spacecraft 105 in a selected direction. Each reaction wheel 1510a-1510c is formed from a block of metal. Each reaction wheel 1510a-1510c is coupled to a respective motor that controls the speed (revolutions per minute) at which the reaction wheel spins. When the motor increases the spin speed, the reaction wheel 1510a-1510c generates and applies more torque to the spacecraft 105 in the direction of the spinning reaction wheel. A proportional effect is true when the motor decreases the spin speed of the reaction wheel.

A set of torque rods 1520a-1520c is arranged within the housing 1515. Each torque rod 1520a-1520c corresponds to a respective reaction wheel. That is, the set of torque rods includes a first 1520a (hidden from view in FIG. 15A), second 1520b, and third torque rod 1520c that correspond one-to-one to a reaction wheel 1510a-1510c. The operation of the torque rods is described more particularly below in reference to FIG. 15C.

FIG. 15B shows a single reaction wheel 1508a. The single reaction wheel 1508a can include the reaction wheel 1510a, which corresponds to the torque rod 1520a. The single reaction wheel 1508a and torque rod 1520a are coupled to and arranged within a portion of the housing 1515a. The portion of the housing 1515a can be similar to the housing 1515.

FIG. 15C illustrates an example Torque Rod according to embodiments of present disclosure. The embodiment of the XACT torque rod 1520 shown in FIG. 15C is for illustration only. Other embodiments could be used without departing from the scope of the present disclosure.

The torque rod 1520 includes a magnetic coil that generates a magnetic field in response to receiving an electric current. A collision of the magnetic field against the Earth's magnetic field applies a small torque motion to the spacecraft 105. The control unit 190 controls the amount of electric current applied to the torque rod 1520 to control intensity and direction of the magnetic field of the torque rods 1520, thereby controlling the torque applied to the spacecraft. The torque rod 1520 can be similar to the torque rods 1520a-1520c.

Figure 16A:
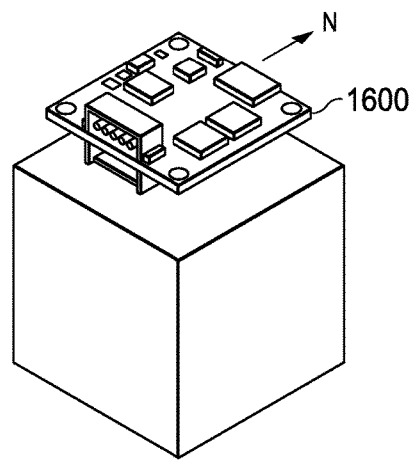
FIGS. 16A-16B illustrate a digital compass, which includes a magnetometer configured to measure Earth's magnetic field and indicate the direction North.
Figure 16B:
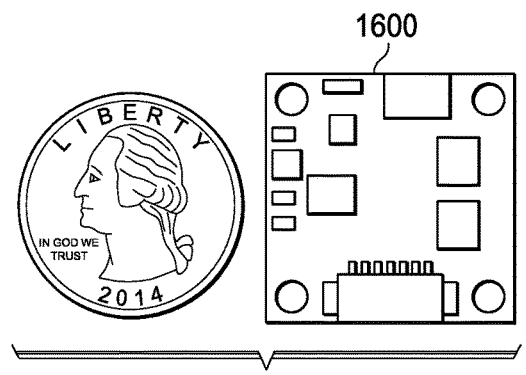

FIGS. 16A-16B illustrates a digital compass 1600, which includes a magnetometer configured to measure Earth's magnetic field and indicate the direction North. The digital compass is approximately the size of a penny coin. In certain embodiments, the digital compass 1600 can be used in the spacecraft testing system 100 as the Torque rod field test equipment 172. Other embodiments can include a magnetometer or a non-digital compass.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A method for testing functionality of a unit under testing (UUT), the method comprising:
    selecting the UUT from a plurality of types of spacecraft;
    selecting a test station at which to conduct a first functionality test on the UUT;
    determining that an agnostic test tool (ATT) is needed at the selected test station;
    coupling a program specific module (PSM) to the ATT using a first interface of the ATT;
    coupling the ATT to the UUT using a second interface of the ATT, the PSM configured to couple to a specific type of UUT and to provide power and telemetry to the specific type of UUT;
    moving, by a robot arm, the UUT and the PSM to the selected test station; and
    conducting the first functionality test on the UUT at the selected test station.

2. The method of claim 1, further comprising:
    before coupling the PSM to the UUT, selecting the PSM based on an actual type of the UUT.

3. The method of claim 1, further comprising:
    mating an end effector of the PSM to an end effector of the UUT, wherein each end effector is configured to establish an electrical, mechanical, and communication connection between the PSM and the UUT by mating to the other end effector.

4. The method of claim 1, wherein:
    the first functionality test comprises a dynamic inertia measurement unit (IMU) characterization test;
    the ATT includes a reference IMU; and
    conducting the first functionality test comprises:
        selecting a series of semi-random movements;
        traversing the UUT through the series of semi-random movements;
        during the traversing, simultaneously collecting measurement data from an IMU of the UUT and reference data from the reference IMU;
        identifying deviations of the measurement data from the reference data; and
        determining an accuracy of the IMU of the UUT based on the deviations.

5. The method of claim 1, wherein:
    the UUT includes a set of reaction wheels;
    the first functionality test comprises a run torque measure of reaction wheel (RW) in 3 axes functionality test;
    the ATT includes a torque plate;
    conducting the first functionality test comprises:
        moving the UUT to align a first reaction wheel in the set of reaction wheels to spin about a first axis, the first axis being parallel to Earth's gravitational force and being orthogonal to second and third axes;
        spinning the first reaction wheel about the first axis;
        sensing and measuring torque that the first reaction wheel applies to the torque plate along the first, second, and third axes;
        receiving measurements of the sensed torque and a spin speed of the first reaction wheel; and
        subsequently rotating the UUT to align the first reaction wheel to spin about one of the second axis and the third axis to repeat the spinning, the sensing and measuring, and the receiving; and
    the first, second, and third axes include three-dimensional horizontal, vertical, and depth axes.

6. The method of claim 5, wherein:
    the set of reaction wheels further includes second and third reaction wheels; and
    conducting the first functionality test further comprises:
        spinning the second reaction wheel about the second axis;
        spinning the third reaction wheel about the third axis;
        sensing and measuring torque that each reaction wheel in the set of reaction wheels applies to the torque plate along the first, second, and third axes; and
        receiving measurements of the sensed torque and a spin speed of each reaction wheel in the set of reaction wheels.

7. The method of claim 1, wherein:
    the first functionality test comprises a torque rod functionality test; and
    conducting the first functionality test comprises:
        moving the UUT to dispose a magnetometer of the UUT in close proximity to a magnet;
        receiving first measurements from the magnetometer indicating an effect of Earth's magnetic field on the magnetometer;
        exciting the magnet to affect the magnetometer;
        receiving second measurements from the magnetometer indicating an effect of the excited magnet combined with the effect of Earth's magnetic field on the magnetometer; and
        comparing the first measurements to the second measurements, the comparison indicating an accuracy of the magnetometer.

8. The method of claim 1, further comprising:
    selecting a second test station at which to conduct a second functionality test on the UUT;
    determining that a second PSM needs to be coupled to the UUT for the second functionality test;
    coupling the second PSM to the UUT;
    moving, by the robot arm, the UUT and the second PSM to the selected second test station; and
    conducting the second functionality test on the UUT at the selected second test station.

9. The method of claim 1, wherein the selected test station is an optical test station, a Flat Field testing station, or a solar load test station.

10. A system for testing functionality of a unit under testing (UUT), the system comprising:
    a program specific module (PSM) configured to couple to the UUT, the PSM configured to couple to a specific type of UUT and to provide power and telemetry to the specific type of UUT;
    a robot arm configured to move the UUT and the PSM to a test station; and a controller configured to:
    select the UUT from a plurality of types of spacecraft;
    select a first test station at which to conduct a first functionality test on the UUT;
    determine that an agnostic test tool (ATT) is needed at the selected first test station;
    control the robot arm to couple the PSM to the ATT using a first interface of the ATT;
    control the robot arm to couple the ATT to the UUT using a second interface of the ATT; and
    control the system to conduct the first functionality test on the UUT at the selected first test station.

11. The system of claim 10, wherein the controller is further configured to:
    select the PSM based on an actual type of the UUT before the PSM is coupled to the ATT; and
    control the robot arm to couple the PSM to the ATT.

12. The system of claim 10, wherein the controller is further configured to:
    control the robot arm to mate an end effector of the PSM to an end effector of the UUT, wherein each end effector is configured to establish an electrical, mechanical, and communication connection between the PSM and the UUT by mating to the other end effector.

13. The system of claim 10, wherein:
    the first functionality test comprises a dynamic inertia measurement unit (IMU) characterization test;
    the ATT includes a reference IMU; and
    to control the system to conduct the first functionality test, the controller is configured to:
        select a series of semi-random movements;
        traverse, using the robot arm, the UUT through the series of semi-random movements;
        during the traversing, simultaneously collect measurement data from an IMU of the UUT and reference data from the reference IMU;
    identify deviations of the measurement data from the reference data; and
        determine an accuracy of the IMU of the UUT based on the deviations.

14. The system of claim 10, wherein:
    the UUT includes a set of reaction wheels;
    the first functionality test comprises a run torque measure of reaction wheel (RW) in 3 axes functionality test;
    the ATT includes a torque plate;
    to control the system to conduct the first functionality test, the controller is configured to:
    cause the UUT to be moved and align a first reaction wheel in the set of reaction wheels to spin about a first axis, the first axis being parallel to Earth's gravitational force and being orthogonal to second and third axes;
        cause the first reaction wheel to spin about the first axis;
            receive measurements of sensed torque that the first reaction wheel applies to the torque plate along the first, second, and third axes and a spin speed of the first reaction wheel; and
        subsequently cause the UUT to be rotated and align the first reaction wheel to spin about one of the second axis and the third axis to repeat the spinning and the receiving; and the first, second, and third axes include three-dimensional horizontal, vertical, and depth axes.

15. The system of claim 14, wherein:
the set of reaction wheels further includes second and third reaction wheels; and
to control the system to conduct the first functionality test, the controller is further configured to:
    cause the second reaction wheel to spin about the second axis;
    cause the third reaction wheel to spin about the third axis; and
        receive measurements of sensed torque that each reaction wheel in the set of reaction wheels applies to the torque plate along the first, second, and third axes and a spin speed of each reaction wheel in the set of reaction wheels.

16. The system of claim 10, wherein:
the first functionality test comprises a torque rod functionality test; and
to control the system to conduct the first functionality test, the controller is configured to:
    control the robot arm to move the UUT to dispose a magnetometer of the UUT in close proximity to a magnet;
    receive first measurements from the magnetometer indicating an effect of Earth's magnetic field on the magnetometer;
    excite the magnet to affect the magnetometer;
    receive second measurements from the magnetometer indicating an effect of the excited magnet combined with the effect of Earth's magnetic field on the magnetometer; and
    compare the first measurements to the second measurements, the comparison indicating an accuracy of the magnetometer.

17. The system of claim 10, wherein the UUT includes at least one spacecraft.

18. The system of claim 10, wherein the system is fully automated.

19. The system of claim 10, wherein:
the ATT is a first ATT; and
the controller is also configured to:
    select a second test station at which to conduct a second functionality test on the UUT;
    determine that a second ATT different than the first ATT needs to be coupled to the PSM for the second functionality test; and
    control the robot arm to couple the UUT and the PSM to the second ATT;
the robot arm is further configured to move the UUT and the second ATT to the selected second test station; and
the controller is further configured to control the system to conduct the second functionality test on the UUT at the selected second test station.

20. The system of claim 10, wherein the selected first test station is an optical test station, a Flat Field testing station, or a solar load test station.

* * * * *